US008053713B2

(12) United States Patent
Ikegami

(10) Patent No.: US 8,053,713 B2
(45) Date of Patent: Nov. 8, 2011

(54) LIGHT SOURCE DEVICE AND LIGHT AMOUNT CORRECTING METHOD TO PERFORM LIGHT AMOUNT CORECTION CORRESPONDING TO A CHANGE IN A LIGHT SOURCE CHARACTERISTIC

(75) Inventor: Tomio Ikegami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 344 days.

(21) Appl. No.: 12/363,121

(22) Filed: Jan. 30, 2009

(65) Prior Publication Data

US 2009/0224136 A1    Sep. 10, 2009

(30) Foreign Application Priority Data

Mar. 6, 2008  (JP) .................................. 2008-056046

(51) Int. Cl.
*G01J 1/32* (2006.01)
*H01S 3/10* (2006.01)
(52) U.S. Cl. ......................................... 250/205; 372/22
(58) Field of Classification Search .................. 250/205; 372/21, 22

See application file for complete search history.

(56) References Cited

U.S. PATENT DOCUMENTS

| 6,859,305 B2* | 2/2005 | Chen et al. ..................... 359/326 |
| 7,242,700 B2* | 7/2007 | Wang .............................. 372/22 |
| 7,529,281 B2* | 5/2009 | Leonardo et al. ............... 372/22 |
| 2008/0013574 A1* | 1/2008 | Furuya et al. ..................... 372/6 |

FOREIGN PATENT DOCUMENTS

| JP | A-7-147466 | 6/1995 |
| JP | A-2003-91853 | 3/2003 |
| JP | A-2004-163527 | 6/2004 |
| JP | A-2005-208231 | 8/2005 |
| JP | A-2007-47354 | 2/2007 |

* cited by examiner

*Primary Examiner* — Thanh X Luu
(74) *Attorney, Agent, or Firm* — Oliff & Berridge, PLC

(57) ABSTRACT

A light source device includes: a semiconductor light-emitting element that emits, according to an input value, light having first wavelength; a wavelength converting element that converts, with a nonlinear optical effect, the light having the first wavelength emitted by the semiconductor light-emitting element into light having second wavelength; a light-amount measuring unit that measures a light amount of the light having the second wavelength emitted from the wavelength converting element; an equivalent-light-amount calculating unit that calculates, on the basis of the measured light amount measured by the light-amount measuring unit, an equivalent light amount equivalent to a light amount of the light having the first wavelength; and a light-amount correcting unit that corrects an emitted light amount of the semiconductor light-emitting element using the input value and the equivalent light amount.

8 Claims, 20 Drawing Sheets

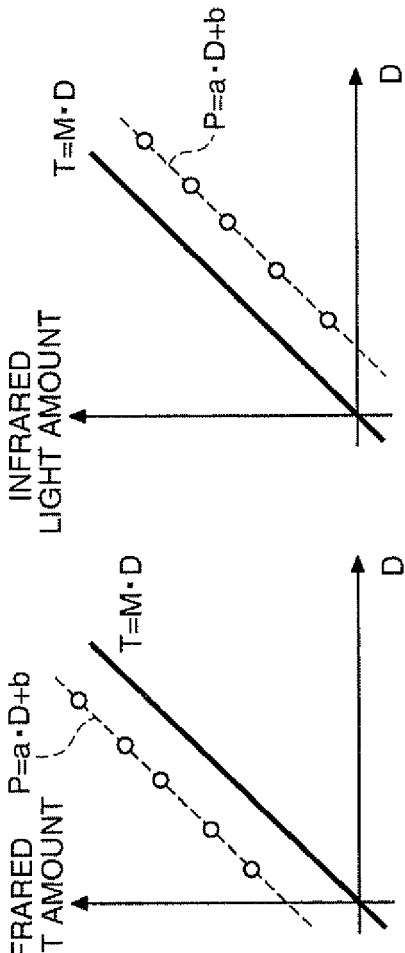
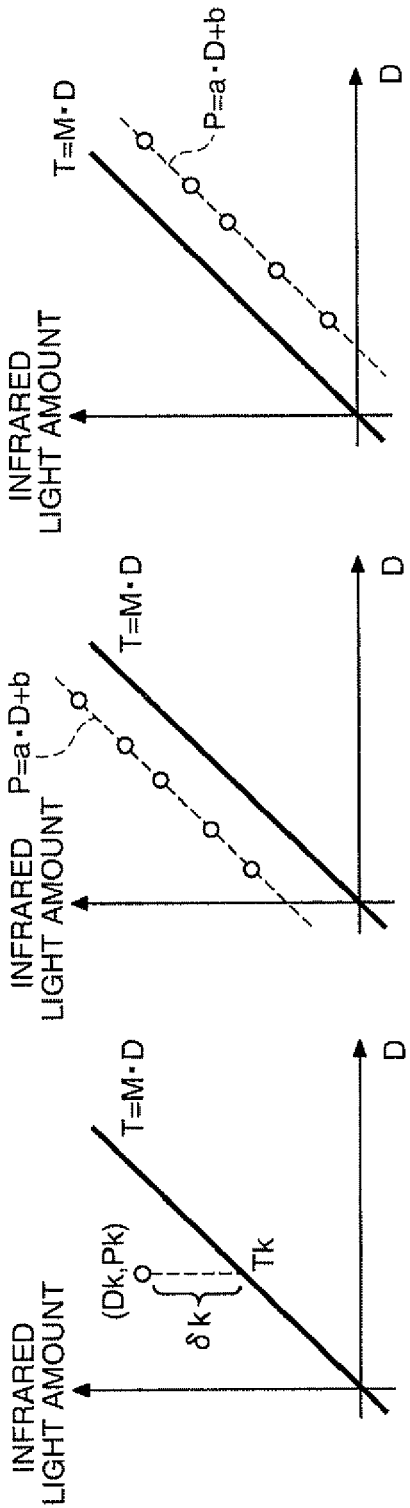
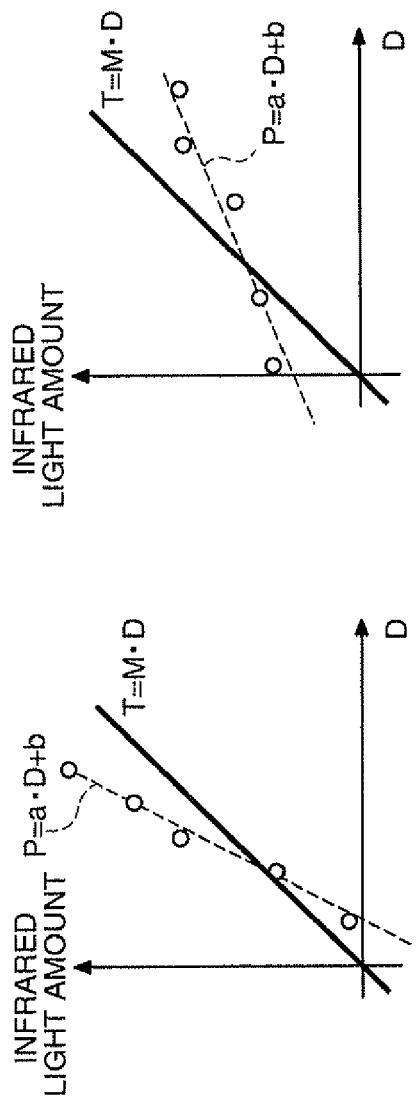

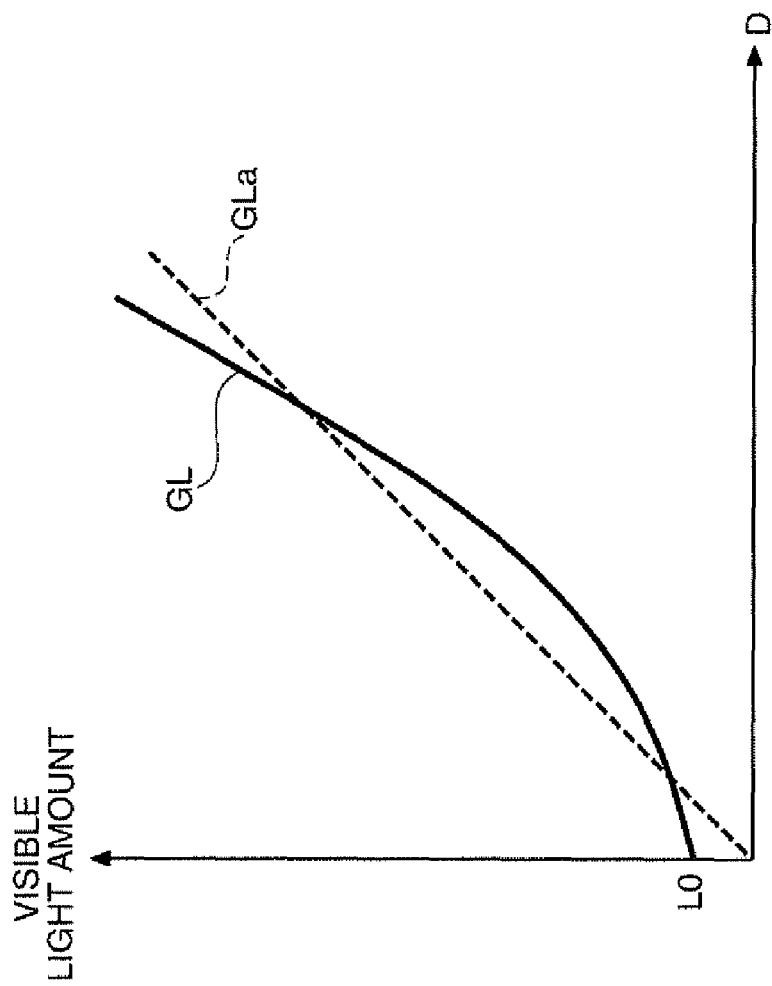

LIGHT SOURCE DEVICE AND LIGHT AMOUNT CORRECTING METHOD TO PERFORM LIGHT AMOUNT CORECTION CORRESPONDING TO A CHANGE IN A LIGHT SOURCE CHARACTERISTIC

BACKGROUND

1. Technical Field

The present invention relates to a light source device, an image display apparatus, and a light amount correcting method.

2. Related Art

In recent years, as a form of an image display device, a laser scan display that raster-scans beam-like light such as a laser beam on a projection surface and displays an image attracts attention. Such a laser scan display has characteristics that, for example, contrast is extremely high compared with, for example, a projector employing a liquid crystal light valve because complete black can be represented by stopping supply of the laser beam, color purity is high because the laser beam has single wavelength, and a beam can be easily shaped (narrowed) because coherence is high. Therefore, the laser scan display is promising as a high-quality display that realizes high contrast, high color reproducibility, and high resolution.

As a laser beam source for the laser scan display, a semiconductor laser element such as a laser diode is mainly used. However, a laser characteristic of such a semiconductor laser element changes because of a temperature change, aged deterioration, and the like. Therefore, it is necessary to correct a laser beam amount such that desired image luminance can be obtained.

For example, JP-A-7-147446 discloses a technique for changing a bias current value of a semiconductor laser element by two or more points, detecting light emission power of the semiconductor laser element with light-reception-power detecting means, and detecting, for example, a change in quantum efficiency between the bias current value and a threshold current value of the semiconductor laser element to set a DC bias current of the semiconductor laser element in bias-current controlling means and set a pulse current corresponding to the change in the quantum efficiency and the like in pulse-current controlling means to maintain a level of a laser output constant. JP-A-2003-91853 discloses a technique for automatically calculating a relational expression between a detected light amount of a laser beam source and a set value of a light output, setting data of this relational expression in a light recording media driving device, and adjusting an output level of the laser beam source.

When a laser beam amount is corrected according to a change in the laser characteristic due to a temperature change or aged deterioration as explained above, in order to further improve correction accuracy, it is desirable to perform light amount correction corresponding to the change in the laser characteristic on a real time basis while actually actuating an apparatus. However, means for the light amount correction is not presented in the techniques in the past.

SUMMARY

An advantage of some aspects of the invention is to provide a light source device that can improve light amount correction accuracy by performing light amount correction corresponding to a change in a light source characteristic on a real time basis, an image display apparatus including the light source device, and a light amount correcting method.

According to an aspect of the invention, there is provided a light source device including:

a semiconductor light-emitting element that emits, according to an input value, light having first wavelength;

a wavelength converting element that converts, with a nonlinear optical effect, the light having the first wavelength emitted by the semiconductor light-emitting element into light having second wavelength;

a light-amount measuring unit that measures a light amount of the light having the second wavelength emitted from the wavelength converting element;

an equivalent-light-amount calculating unit that calculates, on the basis of the measured light amount measured by the light-amount measuring unit, an equivalent light amount equivalent to a light amount of the light having the first wavelength; and a light-amount correcting unit that corrects an emitted light amount of the semiconductor light-emitting element using the input value and the equivalent light amount.

With the light source device according to the aspect of the invention, it is possible to execute light amount correction for the light having the second wavelength on a real time basis by detecting the light having the second wavelength. Further, it is possible to improve accuracy of the correction.

It is preferable that the light source device further includes a current supplying unit that supplies a driving current to the semiconductor light-emitting element according to the input value and a command value outputted by the light-amount correcting unit. In the light source device, the light-amount correcting unit calculates an equivalent light amount error as a difference between the equivalent light amount and a target equivalent light amount that should be emitted by the semiconductor light-emitting element with respect to the input value, calculates, using an integrated value of a product of the equivalent light amount error and the input value, differential efficiency defined by an amount of change in the equivalent light amount with respect to an amount of change in the driving current, calculates, using an integrated value of the equivalent light amount error, a threshold current value of the semiconductor light-emitting element, and corrects the command value according to the differential efficiency and the threshold current value.

With the light source device according to the aspect of the invention, the differential efficiency as one of light source characteristic parameters is corrected, a threshold of a driving signal as one of the light source characteristic parameters is corrected, and a command value for generating a driving signal having the differential efficiency and the threshold after the correction is outputted to the current supplying unit. Therefore, it is possible to perform, on a real time basis, light amount correction corresponding to a change in the light source characteristic due to a temperature change or the like during operation. Further, it is possible to obtain high light amount correction accuracy.

It is preferable that, in the light source device, the command value includes a gradation current command value corrected according to the differential efficiency and a threshold current command value corrected according to the threshold current value, the current supplying unit includes:

a gradation-current generating unit that generates a gradation current corresponding to the input value and the gradation current command value; and a threshold-current generating unit that generates a threshold current corresponding to the threshold-current command value, the current supplying unit adds up the gradation current and the threshold current and supplies an added-up current to the light-emitting unit as the driving current, and the light-amount correcting unit calculates a present value of a first variable representing the gradation current command value by subtracting a numerical value proportional to the integrated value of the product of the equivalent light amount error and the input value from the last value of the first variable and calculates a present value of a second variable representing the threshold current command value by subtracting a numerical value proportional to the integrated value of the equivalent light amount error from the last value of the second variable.

With the light source device according to the aspect of the invention, it is possible to sequentially calculate a first variable and a second variable for minimizing the equivalent light amount error and correct the differential efficiency and the threshold on the basis of the first variable and the second variable. Therefore, it is possible to perform, on a real time basis, light amount correction corresponding to a change in the light source characteristic due to a temperature change of the like during operation. Further, it is possible to obtain high light amount correction accuracy.

It is preferable that, in the light source device according to aspect of the invention, the light-amount correcting unit uses, as an input value for calculation used in calculating the integrated value of the product of the equivalent light amount error and the input value, an average of the input value, an initially set input value set in advance, or a difference between a median value between a minimum input value and a maximum input value and the input value.

With the light source device according to the aspect of the invention, even when deviation between the target equivalent light amount and the equivalent light amount occurs to reduce the integrated value of the equivalent light amount error and the integrated value of the product of the equivalent light amount error and the input value to substantially zero, it is possible to prevent the integrated value of the product of the equivalent light amount error and the input value from being reduced to zero. Further, it is possible to prevent the correction operation in the light-amount correcting unit from being stopped.

It is preferable that, in the light source device according to the aspect of the invention, the light-amount correcting unit multiplies a value of the product of the equivalent light amount error and the input value with a weighting constant for setting the value smaller as the value is generated further in the past to thereby calculate an integrated value of the product of the equivalent light amount error and the input value.

With the light source device according to the aspect of the invention, it is possible to perform light amount correction with nearest measurement data weighted. Further, it is possible to improve light amount correction accuracy.

It is preferable that, in the light source device according to the aspect of the invention, as an initial setting operation for correcting an offset of a measured light amount of the light-amount measuring unit during power-on, after acquiring, as a black level light amount, the equivalent light amount for completely turning off the semiconductor light-emitting element at the time when the gradation current, the threshold current, and the input value are outputted to the current supplying unit, the light-amount correcting unit increases the threshold current and reduces the threshold current when a value obtained by subtracting the black level light amount from the equivalent light amount reaches a first set light amount for specifying predetermined brightness, and sets, as an initial value of the threshold current, the threshold current at the time when the value obtained by subtracting the black level light amount from the equivalent light amount reaches a second set light amount regarded as a black level, and outputs a maximum value of the input value to the current supplying unit, increases the gradation current, and sets, as an initial value of the gradation current, the gradation value at the time when the value obtained by subtracting the black level light amount from the equivalent light amount reaches a third set light amount for specifying a maximum target light emission amount.

With the light source device according to the aspect of the invention, it is possible to obtain initial values of a gradation current and a threshold current with the corrected offset of the measured light amount of the light-amount measuring unit. Further, it is possible to improve light amount correction accuracy.

It is preferable that, in the light source device according to the aspect of the invention, the light-amount correcting unit uses, as the last value of the second variable in calculating a present value of the second variable in the first time, the initial value of the threshold current calculated by the initial setting operation and uses, as the last value of the first variable in calculating a present value of the first variable in the first time, the initial value of the gradation current.

With the light source device according to the aspect of the invention, it is possible to accurately calculate the present value of the second variable and the present value of the first variable in the first time. Therefore, it is possible to further improve light amount correction accuracy.

The invention can be realized in various forms such as a light source device including a semiconductor light-emitting element, a control device and a control method for the semiconductor light-emitting element, an image display apparatus including the light source device, a control device and a control method for the image display apparatus, a computer program for realizing functions of the methods and the devices, and a recording medium having the computer program recorded therein.

BRIEF DESCRIPTION OF THE DRAWINGS

The invention will be described with reference to the accompanying drawings, wherein like numbers reference like elements.

FIGS. 9A to 9E are graphs for explaining a principle of light amount correction performed by a light-amount correcting circuit.

FIG. 10 is a graph for explaining, as a comparative example, light amount correction performed according to a visible light amount.

DESCRIPTION OF EXEMPLARY EMBODIMENTS

A. Embodiment

An embodiment of the invention is explained below with reference to the accompanying drawings.

Figure 1:
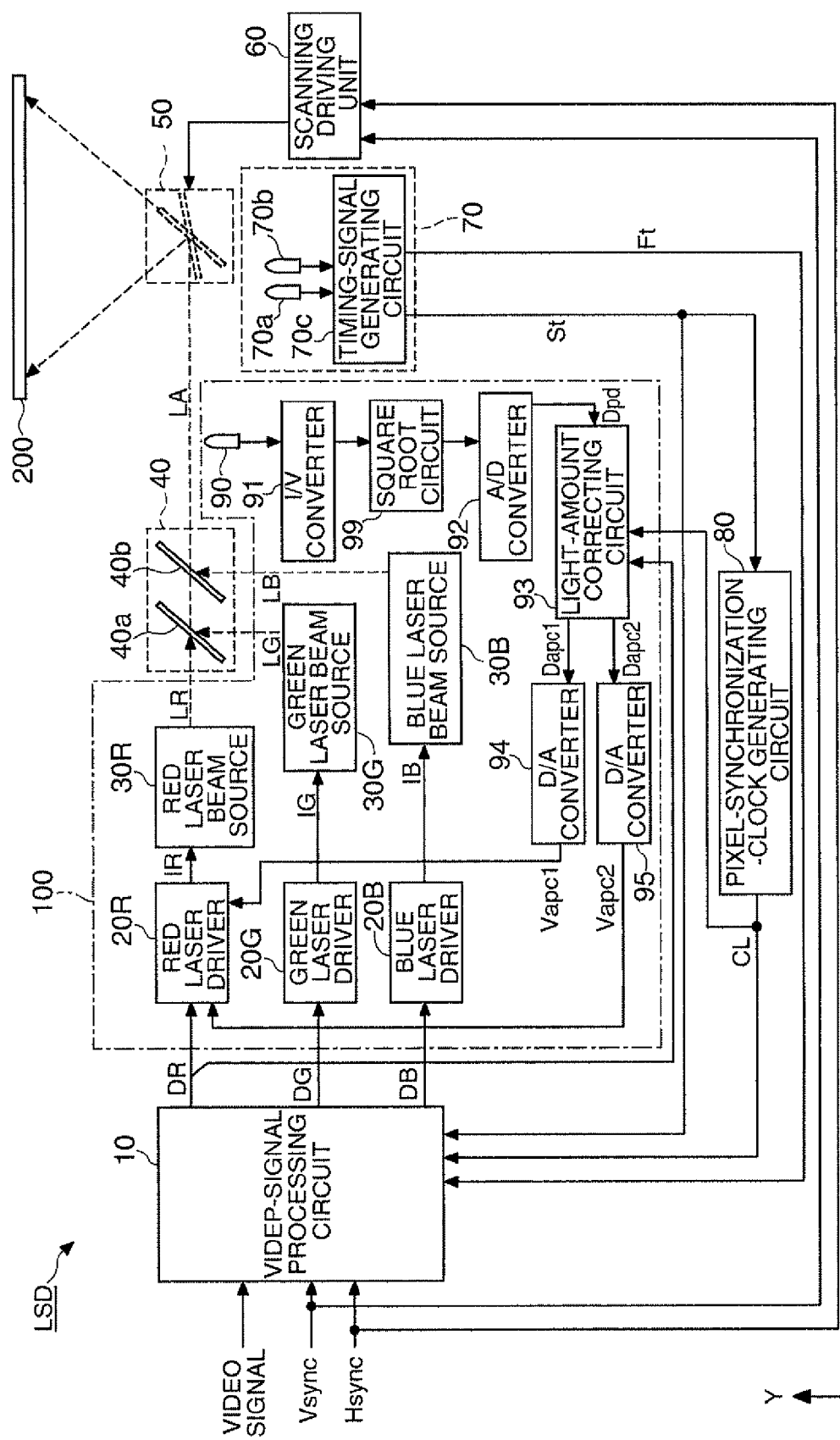
FIG. 1 is a block diagram of a schematic configuration of an image display apparatus.

FIG. 1 is a block diagram of a configuration of an image display apparatus LDS according to this embodiment. As an example of the image display apparatus LSD, a laser scan display that scans a laser beam on a screen (a projection surface) 200 to display an image is explained.

The screen 200 is a transmission screen that transmits laser beams LR, LG, and LB scanned by a laser scanning unit 50 explained later. In other words, the image display apparatus LSD is a rear projection projector. A user views a displayed image on a surface on the opposite side of an irradiation surface for the laser beams LR, LG, and LB in the screen 200. Although not shown in the figure, in the image display apparatus LSD, only the surface on the viewing side of the screen 200 is exposed and other components are stored in a housing to eliminate the influence of external light.

As shown in FIG. 1, the image display apparatus LSD according to this embodiment includes a light source device 100, a video-signal processing circuit 10, an optical system for optical axis alignment 40, a laser scanning unit 50, a scanning driving unit 60, an irradiation-position detecting unit 70, and a pixel-synchronization-clock generating circuit 80. The light source device 100 includes laser drivers 20R, 20G, and 20B for respective display lights (red, green, and blue), laser beam sources 30R, 30G, and 30B for the respective colors, a photoelectric conversion element 90, an I/V converter 91, an analog square root circuit 99, an A/D converter 92, a light-amount correcting circuit 93, and two D/A converters 94 and 95. A correction system circuit block including the photoelectric conversion element 90, the I/V converter 91, the A/D converter 92, the light-amount correcting circuit 93, and the D/A converters 94 and 95 is provided to correspond to each of the red laser driver 20R, the green laser driver 20G, and the blue laser driver 20B (i.e., correspond to each of the colors). However, in FIG. 1, for convenience of illustration, only the correction system circuit block corresponding to the red laser driver 20R is shown as a representative one.

The video-signal processing circuit 10 receives, as inputs, video signals and synchronization signals (a vertical synchronization signal Vsync and a horizontal synchronization signal Hsync) transmitted from an image supply apparatus (not shown) on the outside such as a notebook personal computer, generates, on the basis of the video signals and the synchronization signals, digital gradation data for specifying gradation values corresponding to respective pixels of an image that should be displayed, and stores the digital gradation data in an internal memory in units of one frame. In this embodiment, for convenience of explanation, the number of bits N of the digital gradation data is set to four. In other words, the image display apparatus LSD can perform image display of sixteen gradations (4096 colors) from "0" to "15".

The video-signal processing circuit 10 reads out the digital gradation data stored in the internal memory on the basis of a pulse-like frame timing signal Ft for specifying the start of one frame and a pulse-like scanning timing signal St for specifying the start and the end of one horizontal scanning period. The pulse-like frame timing signal Ft and the pulse-like scanning timing signal St are inputted from the irradiation-position detecting unit 70. The video-signal processing circuit 10 outputs, in synchronization with a pulse-like pixel synchronization clock signal CL for specifying irradiation timing of laser beams corresponding to the respective pixels in one horizontal scanning period, the digital gradation data of the pixel corresponding to an irradiation position of the laser beam to the light source device 100. The pulse-like pixel synchronization clock signal CL is inputted from the pixel-synchronization-clock generating circuit 80. More specifically, when the pixel corresponding to the irradiation position of the laser beam is a pixel for red, the video-signal processing circuit 10 outputs red gradation data DR for the red pixel to the red laser driver 20R. When the pixel corresponding to the irradiation position of the laser beam is a pixel for green, the video-signal processing circuit 10 outputs green gradation data DG for the green pixel to the green laser driver 20G. When the pixel corresponding to the irradiation position of the laser beam is a pixel for blue, the video-signal processing circuit 10 outputs blue gradation data DB for the blue pixel to the blue laser driver 20B. The video-signal processing circuit 10 outputs the red gradation data DR to the light-amount correcting circuit 93 of the correction system circuit block for red, outputs the green gradation data DG to a light-amount correcting circuit (not shown) of a correction system circuit block for green, and outputs the blue gradation data DB to a light-amount correcting circuit (not shown) of a correction system circuit block for blue.

The light source device 100 receives the gradation data DR, DG, and DB from the video-signal processing circuit 10. The light source device 100 emits laser beams LR, LG, and LB corresponding to the gradation data DR, DG, and DB toward the optical system for optical axis alignment 40. More specifically, the red laser beam source 30R generates the laser beam LR of a single color of red according to a laser driving current IR supplied from the red laser driver 20R and irradiates the laser beam LR toward the optical system for optical axis alignment 40 (specifically, a first dichroic mirror 40a) provided on an optical axis LA. In this embodiment, as shown in FIG. 1, a direction substantially parallel to a horizontal plane is set as an X axis, a direction orthogonal to the X axis on the horizontal plane is set as a Y axis, and a direction substantially perpendicular to the horizontal plane (an XY plane) is set as a Z axis. The optical axis LA is set substantially parallel to the X axis. An emission optical axis of the laser beam LR coincides with the optical axis LA.

The green laser beam source 30G generates the laser beam LG of a single color of green according to a laser driving current IG supplied from the green laser driver 20G and irradiates the laser beam LG toward the optical system for optical axis alignment 40 (specifically, the first dichroic mirror 40a) along the Y axis. The blue laser beam source 30B generates the laser beam LB of a single color of green according to a laser driving current IB supplied from the blue laser driver 20B and irradiates the laser beam LB toward the optical system for optical axis alignment 40 (specifically, a second dichroic mirror 40b) along the Y axis. Details of the light source device 100 are explained later.

The optical system for optical axis alignment 40 is an optical axis for performing optical axis alignment for the laser beams LR, LG, and LB. The optical system for optical axis alignment 40 includes the first dichroic mirror 40a and the second dichroic mirror 40b. The first dichroic mirror 40a is set on the optical axis LA at the inclination of 45° with respect to the optical axis LA. The first dichroic mirror 40a transmits the laser beam LR toward the second dichroic mirror 40b along the optical axis LA and, on the other hand, reflects the laser beam LG toward the second dichroic mirror 40b to coincide with the optical axis LA. The second dichroic mirror 40b is set on the optical axis LA at the inclination of 45° with respect to the optical axis LA. The second dichroic mirror 40b transmits the laser beam LR and the laser beam LG toward the laser scanning unit 50 along the optical axis LA and, on the other hand, reflects the laser beam LB toward the laser scanning unit 50 to coincide with the optical axis LA.

The laser scanning unit 50 is a resonant MEMS (Micro Electro Mechanical System) scanner. The laser scanning unit 50 scans, on the basis of a scanning driving signal inputted from the scanning driving unit 60, the laser beams LR, LG, and LB made incident via the optical system for optical axis alignment 40 on the screen 200. A detailed configuration of the laser scanning unit 50 is explained below.

Figure 2:
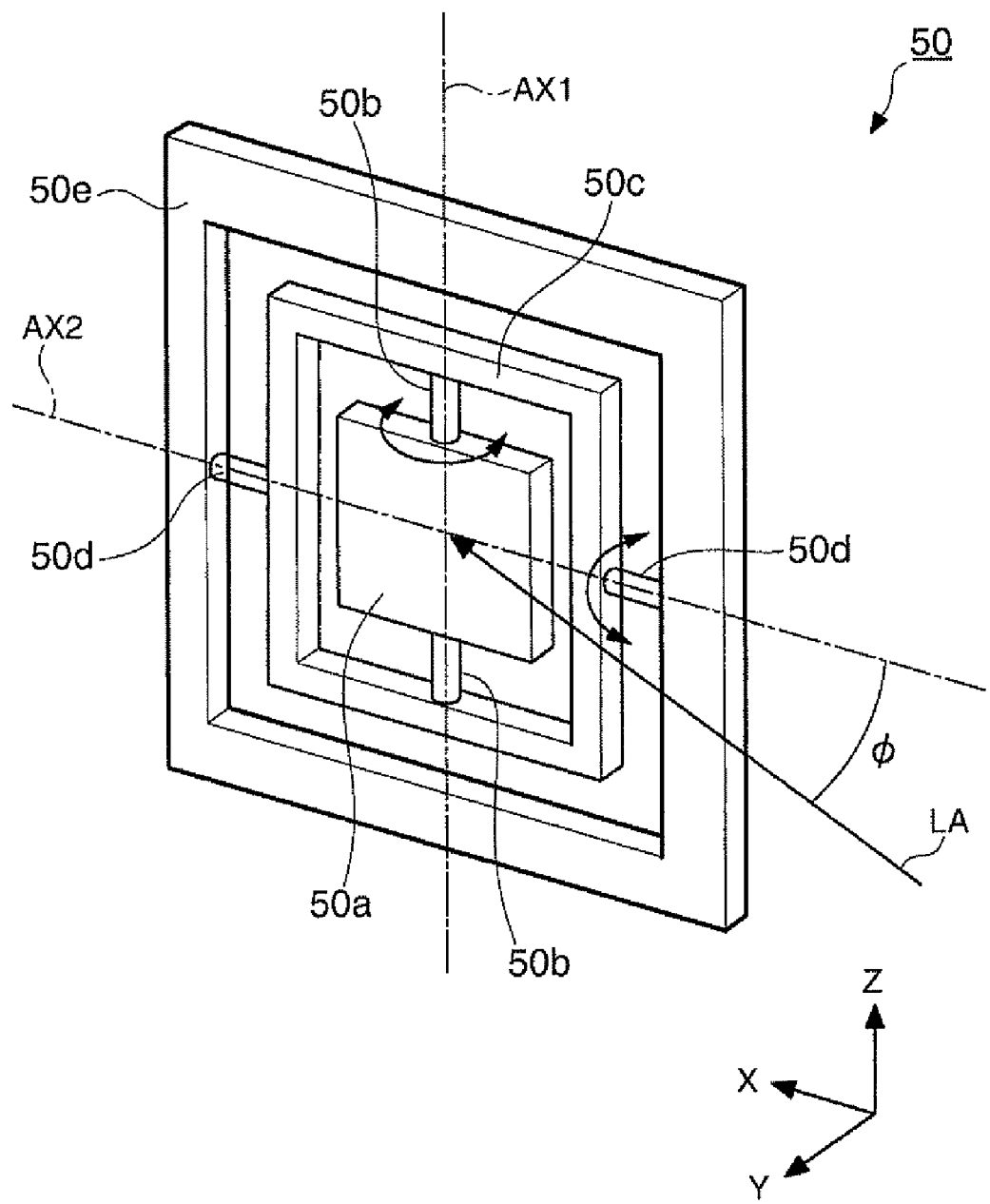
FIG. 2 is a schematic diagram of a configuration of a laser scanning unit.

FIG. 2 is a schematic diagram of the laser scanning unit 50 as the MEMS scanner. As shown in FIG. 2, the laser scanning unit 50 includes a reflection mirror 50a, a first torsion spring 50b, an inner frame section 50c, a second torsion spring 50d, and an outer frame section 50e. The reflection mirror 50a, the first torsion spring 50b, the inner frame section 50c, the second torsion spring 50d, and the outer frame section 50e are integrally formed by micro-processing a semiconductor material such as monocrystal silicon.

The reflection mirror 50a is a tabular member on which a reflection film for reflecting the laser beams LR, LG, and LB toward the screen 200 is formed on a reflection surface side thereof. The reflection mirror 50a is coupled to the inner frame section 50c by the first torsion spring (a first rotation supporting section) 50b provided along a first axis AX1 (when the XY plane is a horizontal plane, substantially perpendicular to the horizontal plane) that extends along the reflection surface. In other words, the reflection mirror 50a is supported rotatably around the first axis AX1 by the first torsion spring 50b. A shape of the reflection mirror 50a may be square as shown in FIG. 2 or may be circular or elliptical.

The inner frame section 50c is a tabular member of a picture frame shape. The inner frame section 50c is coupled to the reflection mirror 50a by the first torsion spring 50b and coupled to the outer frame section 50e by the second torsion spring (a second rotation supporting section) 50d provided along a second axis AX2 (when the XY plane is a horizontal plane, substantially parallel to the horizontal plane) that extends along the reflection surface and is substantially orthogonal to the first axis AX1. In other words, the inner frame section 50c (the reflection mirror 50a) is supported rotationally around the second axis AX2 by the second torsion spring 50d. The outer frame section 50e is a tabular member of a picture frame shape. The outer frame section 50e is coupled to the inner frame section 50c by the second torsion spring 50d and coupled to a not-shown fixed section. In this embodiment, since the optical axis LA is set to be parallel to the X axis, when the second axis AX2 is set parallel to the X axis, the laser beams LR, LG, and LB are blocked by the outer frame section 50e and are not made incident on the reflection mirror 50a. In order to prevent such a problem, in this embodiment, as shown in FIG. 2, the laser scanning unit 50 is arranged such that the second axis AX2 has a tilt φ with respect to the optical axis LA (the X axis).

The laser scanning unit 50 having such a configuration scans the laser beams LR, LG, and LB in the X axis direction on the screen 200 (i.e., horizontal direction scanning) by rotating the reflection mirror 50a around the first axis AX1. The laser scanning unit 50 scans the laser beams LR, LG, and LB in the Z axis direction on the screen 200 (i.e., vertical direction scanning) by rotating the reflection mirror 50a (the inner frame section 50c) around the second axis AX2. As a driving system for rotating the reflection mirror 50a, as disclosed in JP-A-2007-47354, a system for using electrostatic force generated by applying a voltage signal to an electrode arranged in a predetermined position as a scanning driving signal may be adopted. Besides, a system for using Lorentz force generated by providing a permanent magnet to form a magnetic field and feeding a current signal to coils provided in the reflection mirror 50a and the inner frame section 50c as a scanning driving signal may be adopted. Since a driving system for the reflection mirror 50a in such an MEMS scanner is a publicly-known technique, detailed explanation of the driving system is omitted.

Referring back to FIG. 1, the scanning driving unit 60 receives the synchronization signals (the vertical synchronization signal Vsync and the horizontal synchronization signal Hsync) as inputs. The scanning driving unit 60 generates, on the basis of the vertical synchronization signal Vsync and the horizontal synchronization signal Hsync, a scanning driving signal for driving to rotate the reflection mirror 50a of the laser scanning unit 50 and outputs the scanning driving signal to the laser scanning unit 50.

The irradiation-position detecting unit 70 detects irradiation positions on the screen 200 of the laser beams LR, LG, and LB. The irradiation-position detecting unit 70 includes a horizontal angle sensor 70a, a vertical angle sensor 70b, and a timing-signal generating circuit 70c. The horizontal angle sensor 70a detects a rotation angle θ1 around the first axis AX1 of the reflection mirror 50a and outputs a horizontal angle detection signal indicating the rotation angle θ1 to the timing-signal generating circuit 70c. The vertical angle sensor 70b detects a rotation angle θ2 around the second axis AX2 of the reflection mirror 50a and outputs a vertical angle detection signal indicating the rotation angle θ2 to the timing-signal generating circuit 70c. As the horizontal angle sensor 70a and the vertical angle sensor 70b, an angle sensor of an optical system for irradiating light on a rear surface (a surface on the opposite side of a reflection surface for a laser beam) of the reflection mirror 50a and receiving the light reflected by the rear surface to detect an angle is used.

Figure 3:
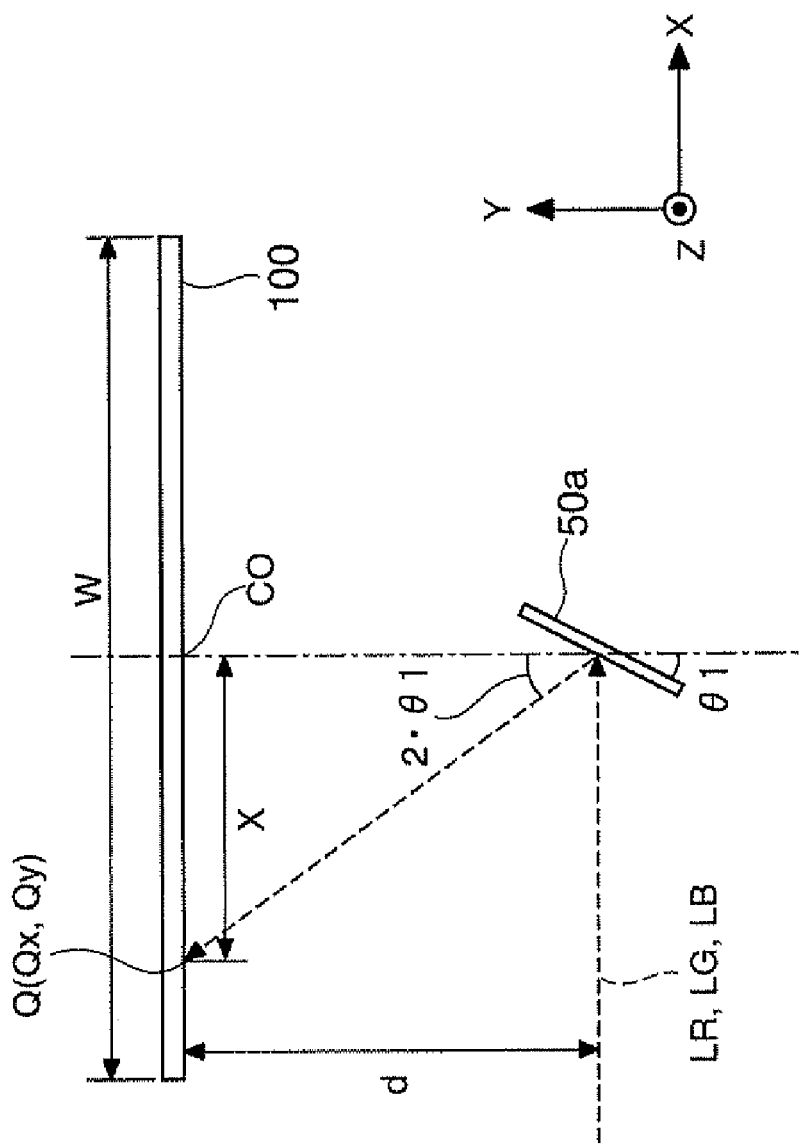
FIG. 3 is a schematic diagram for explaining a rotation angle of a reflection mirror.

As shown in FIG. 3, the rotation angle θ1 detected by the horizontal angle sensor 70a is an angle of the reflection mirror 50a with respect to the Y axis on the XY plane. As shown in FIG. 3, a position a distance X away in the X axis direction from a center point C0 of the screen 200 having width W is set as an irradiation position Q of a laser beam. A coordinate Qx in a horizontal scanning direction of the irradiation position Q is represented by a function of the rotation angle θ1 if a distance "d" between the reflection mirror 50a and the screen 200 is known. On the other hand, the rotation angle θ2 detected by the vertical angle sensor 70b is an angle of the reflection mirror 50a with respect to the Y axis on a YZ plane. A coordinate Qy in a vertical scanning direction of the irradiation position Q is represented by a function of the rotation angle θ2. In other words, if the rotation angle θ1 and the rotation angle θ2 of the reflection mirror 50a are detected, it is possible to unconditionally calculate the irradiation position Q (Qx, Qy).

The timing-signal generating circuit 70c (FIG. 1) generates, on the basis of the horizontal angle detection signal indicating the rotation angle θ1, a pulse-like scanning timing signal St for specifying the start and the end of one horizontal scanning period and outputs the pulse-like scanning timing signal St to the video-signal processing circuit 10 and the pixel-synchronization-clock generating circuit 80. The timing-signal generating circuit 70c generates, on the basis of the vertical angle detection signal indicating the rotation angle θ2, a pulse-like frame timing signal Ft for specifying the start of one frame and outputs the pulse-like frame timing signal Ft to the video-signal processing circuit 10.

Specifically, the rotation angle θ1 corresponding to the irradiation position Q equivalent to a start position and an end position of one horizontal scanning period and the rotation angle θ2 corresponding to the irradiation position Q equivalent to a start position of one frame are set in advance in the timing-signal generating circuit 70c on the basis of the unconditional relation between the rotation angles θ1 and θ2 of the reflection mirror 50a and the irradiation position Q. The timing-signal generating circuit 70c outputs the scanning timing signal St when the rotation angle θ1 indicated by the horizontal angle detection signal coincides with the rotation angle θ1 set in advance. The timing-signal generating circuit 70c outputs the frame timing signal Ft when the rotation angle θ2 indicated by the vertical angle detection signal coincides with the rotation angle θ2 set in advance.

The pixel-synchronization-clock generating circuit 80 receives the scanning timing signal St as an input. The pixel-synchronization-clock generating circuit 80 generates, on the basis of the scanning timing signal St, the pulse-like pixel synchronization clock signal CL for specifying irradiation timing of the laser beams LR, LG, and LB corresponding to the respective pixels in one horizontal scanning period and outputs the pixel synchronization clock signal CL to the video-signal processing circuit 10 and the light-amount correcting circuit 93. The pixel synchronization clock signal CL is outputted to the light-amount correcting circuits of the correction system circuit blocks corresponding to the respective colors.

With the configuration explained above, the image display apparatus LSD can display an image on the screen 200 using a laser beam from the light source device 100. In general, it is known that an input and output characteristic of a semiconductor light-emitting element changes because of a temperature change and aged deterioration. Therefore, the light source device 100 according to this embodiment performs light amount correction corresponding to a change in characteristic of a light source on a real time basis with a method explained below.

Figure 4:
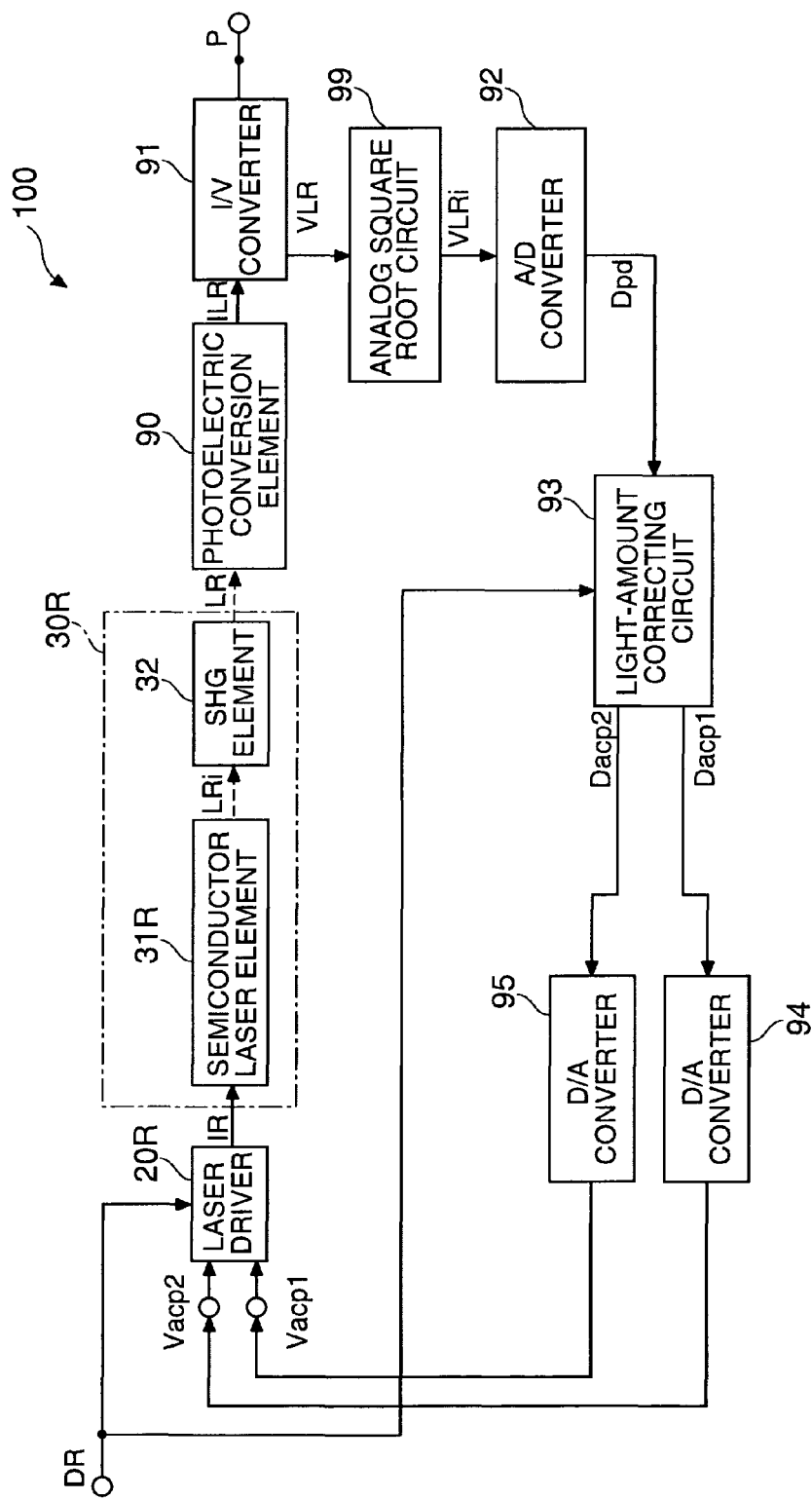
FIG. 4 is a block diagram of a configuration of a light source device.

FIG. 4 is a block diagram of a detailed configuration of the light source device 100 of the image display apparatus LSD. In FIG. 4, components of a system for emitting the red laser beam LR are shown. However, systems for emitting the laser beams of the other colors have the same configuration. It is unnecessary to apply the configuration shown in FIG. 4 to the light source devices for all the color lights and only has to be applied to the light source device for at least one color light.

The red laser driver 20R receives, as inputs, the red gradation data DR, threshold current command voltage Vapc1 outputted from the light-amount correcting circuit 93 via the D/A converter 94, and gradation current command voltage Vapc2 outputted from the light-amount correcting circuit 93 via the D/A converter 95. The red laser driver 20R generates the laser driving current IR corresponding to the red gradation data DR using the threshold current command voltage Vapc1 and the gradation current command voltage Vapc2 and outputs the laser driving current IR to the red laser beam source 30R. A detailed configuration of the red laser driver 20R is explained below.

Figure 5:
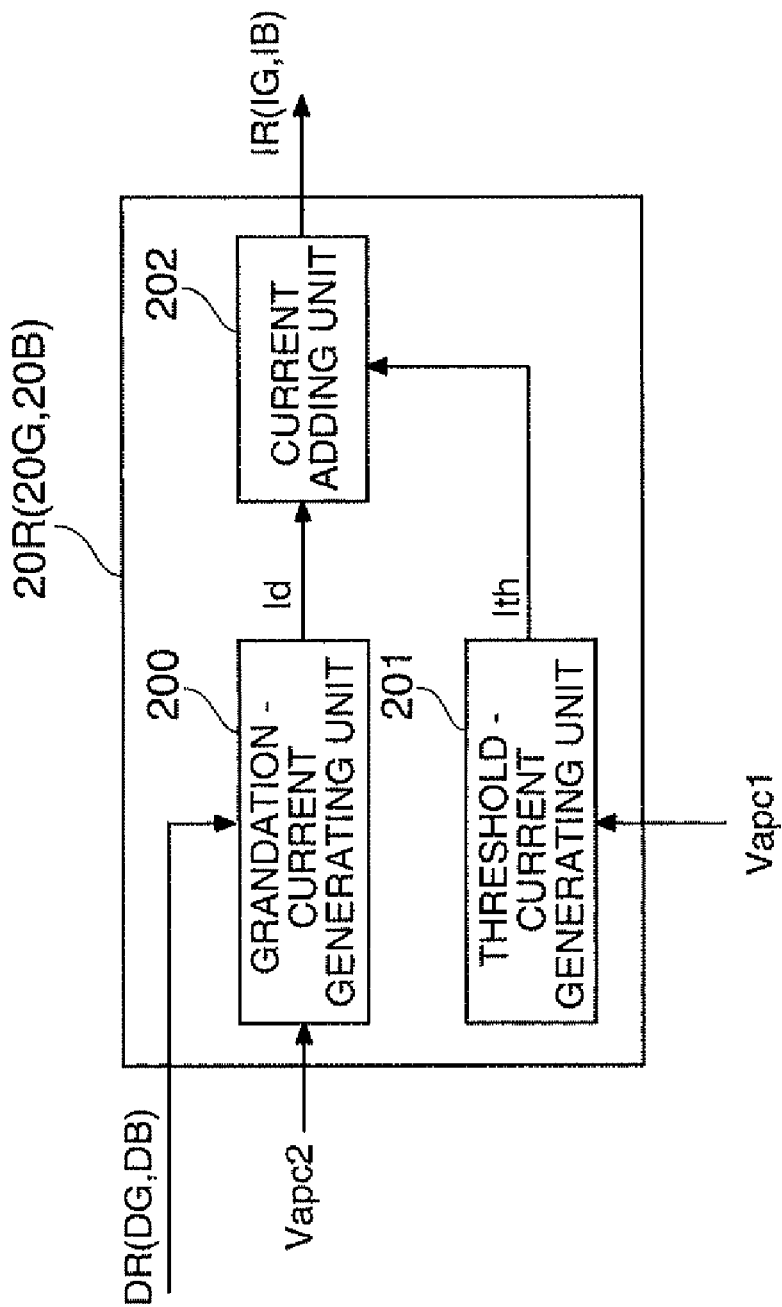
FIG. 5 is a block diagram of a schematic configuration of a red laser driver.

FIG. 5 is a block diagram of the configuration of the red laser driver 20R. As shown in FIG. 5, the red laser driver 20R includes a gradation-current generating unit 200, a threshold-current generating unit 201, and a current adding unit 202.

The gradation-current generating unit 200 generates a gradation current Id (=H1·Vapc2·D) as a product of a gradation value D indicated by the red gradation data DR, the gradation current command voltage Vapc2, and a coefficient H1 and outputs the gradation current Id to the current adding unit 202. The threshold-current generating unit (threshold-current generating means) 201 generates a threshold current Ith (=H2·Vapc1) as a product of the threshold current command voltage Vapc1 and a coefficient H2 and outputs the threshold current Ith to the current adding unit 202. The current adding unit (current adding means) 202 adds up the gradation current Id and the threshold current Ith and outputs the added-up current to the red laser beam source 30R as a laser driving current IR (=Id+Ith).

Figure 6:
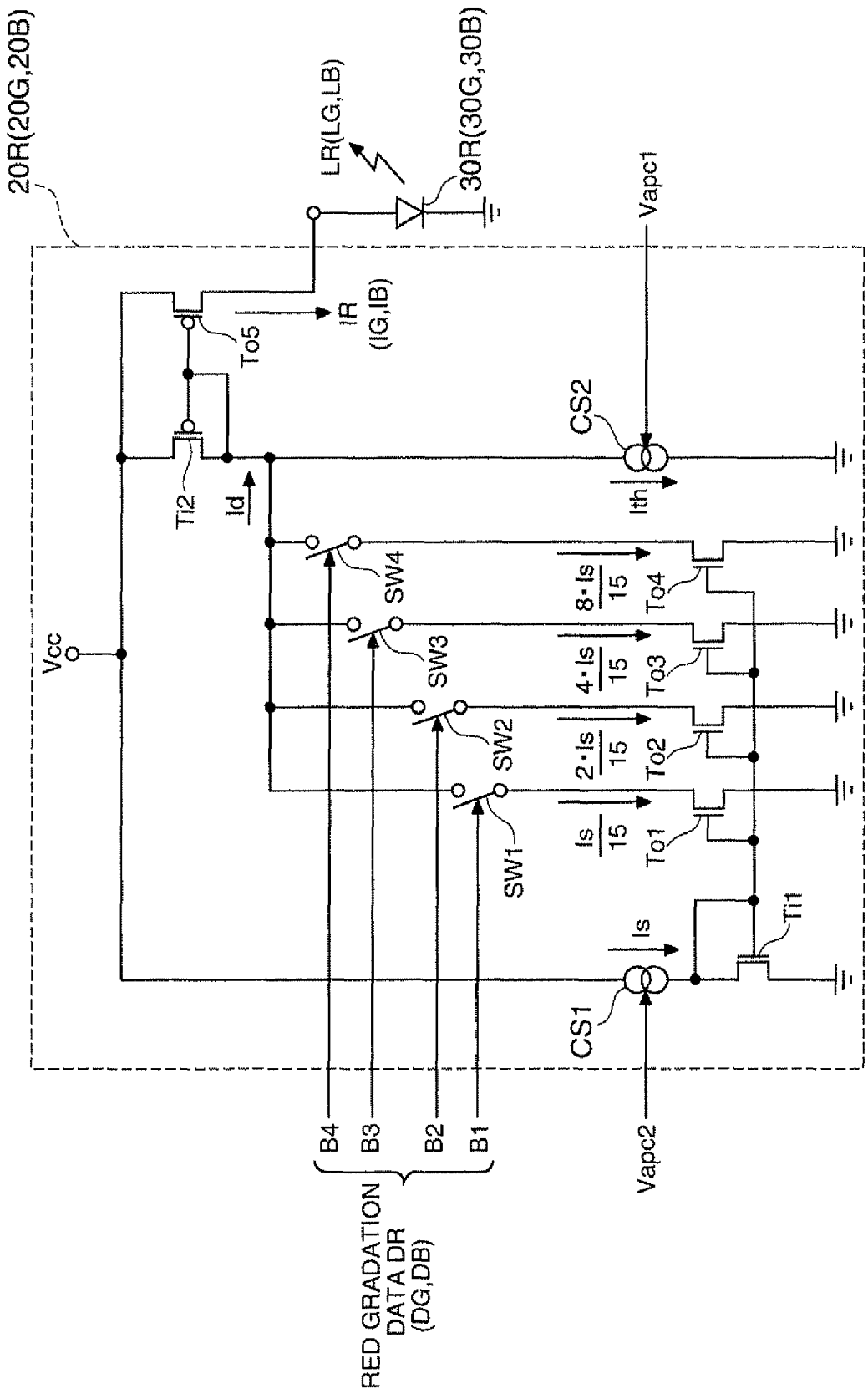
FIG. 6 is a diagram for explaining a circuit configuration of the red laser driver.

A specific circuit configuration diagram of the red laser driver 20R having the configuration explained above is shown in FIG. 6. As shown in FIG. 6, the red laser driver 20R can be configured by a first current source CS1, a second current source CS2, a first input side transistor Ti1, a second input side transistor Ti2, a first output side transistor To1, a second output side transistor To2, a third output side transistor To3, a fourth output side transistor To4, a fifth output side transistor To5, a first switch element SW1, a second switch element SW2, a third switch element SW3, and a fourth switch element SW4.

The first current source CS1 is a variable-gain constant current source that receives the gradation current command voltage Vapc2 as an input and generates an electric current Is (=H1·Vapc2) as a product of the gradation current command voltage Vapc2 and the coefficient H1. An input terminal of the first current source CS1 is connected to a power supply line Vcc and an output terminal thereof is connected to a drain terminal and a gate terminal of the first input side transistor Ti1.

The first input side transistor Ti1 is an n-channel MOS (Positive Metal Oxide Semiconductor) transistor. A drain terminal of the first input side transistor Ti1 is connected to the output terminal of the first current source CS1, a gate terminal thereof is connected to the output terminal of the first current source CS1 and gate terminals of the first to fourth output side transistors To1 to To4, and a source terminal thereof is connected to a ground line.

The first output side transistor To1 is an n-channel MOS transistor. A drain terminal of the first output side transistor To1 is connected to one terminal of the first switch element SW1, a gate terminal thereof is connected to the gate terminals of the first input transistor Ti1 and the second to fourth output side transistors To2 to To4, and a source terminal thereof is connected to the ground line.

The second output side transistor To2 is an n-channel MOS transistor. A drain terminal of the second output side transistor To2 is connected to one terminal of the second switch element SW2, a gate terminal thereof is connected to the gate terminals of the first input side transistor Ti1, the first output side transistor To1, the third output side transistor To3, and the fourth output side transistor To4, and a source terminal thereof is connected to the ground line.

The third output side transistor To3 is an n-channel MOS transistor. A drain terminal of the third output side transistor To3 is connected to one terminal of the third switch element SW3, a gate terminal thereof is connected to the gate terminals of the first input side transistor Ti1, the first output side transistor To1, the second output side transistor To2, and the fourth output side transistor To4, and a source terminal thereof is connected to the ground line.

The fourth output side transistor To4 is an n-channel MOS transistor. A drain terminal of the fourth output side transistor To4 is connected to one terminal of the fourth switch element SW4, a gate terminal thereof is connected to the gate terminals of the first input side transistor Ti1, the first to third output side transistors To1 to To3, and a source terminal thereof is connected to the ground line.

A current mirror circuit having the first input side transistor Ti1 as a transistor on an input side and having the first to fourth output side transistors To1 to To4 as transistors on an output side is configured by the first current source CS1, the first input side transistor Ti1, and the first to fourth output side transistors To1 to To4. In this embodiment, electric characteristics of the first to fourth output side transistors To1 to To4 are set to generate electric currents corresponding to bit data corresponding to the transistors.

Specifically, the first output side transistor To1 corresponds to bit data B1 of a first bit as an LSB in the 4-bit red gradation data DR. The electric characteristic of the first output side transistor To1 is set such that an electric current 1/15 as small as the electric current Is generated by the first current source CS1 is generated. The second output side transistor To2 corresponds to bit data B2 of a second bit in the 4-bit red gradation data DR. The electric characteristic of the second output side transistor To2 is set such that an electric current 2/15 as small as the electric current Is is generated. The third output side transistor To3 corresponds to bit data B3 of a third bit in the 4-bit red gradation data DR. The electric characteristic of the third output side transistor To3 is set such that an electric current 4/15 as small as the electric current Is is generated. The fourth output side transistor To4 corresponds to bit data B4 of a fourth bit as an MSB in the 4-bit red gradation data DR. The electric characteristic of the fourth output side transistor To4 is set such that an electric current 8/15 as small as the electric current Is is generated.

The first switch element SW1 is a switch element that corresponds to the bit data B1 of the first bit as the LSB in the 4-bit red gradation data DR and switches connection and unconnection between two terminals according to a value of the bit data B1. One terminal of the first switch element SW1 is connected to the drain terminal of the first output side transistor To1 and the other terminal thereof is connected to an input terminal of the second current source CS2. In this embodiment, the two terminals are connected when the bit data B1 is "1" and are unconnected when the bit data B1 is "0".

The second switch element SW2 is a switch element that corresponds to the bit data B2 of the second bit in the 4-bit red gradation data DR and switches connection and unconnection between two terminals according to a value of the bit data B2. One terminal of the second switch element SW2 is connected to the drain terminal of the second output side transistor To2 and the other terminal thereof is connected to the input terminal of the second current source CS2. In this embodiment, the two terminals are connected when the bit data B2 is "1" and are unconnected when the bit data B2 is "0".

The third switch element SW3 corresponds to the bit data B3 of the third bit in the 4-bit red gradation data DR and switches connection and unconnection between two terminals according to a value of the bit data B3. One terminal of the third switch element SW3 is connected to the drain terminal of the third output side transistor To3 and the other terminal thereof is connected to the input terminal of the second current source CS2. In this embodiment, the two terminals are connected when the bit data B3 is "1" and are unconnected when the bit data B3 is "0".

The fourth switch element SW4 corresponds to the bit data B4 of the fourth bit as the MSB in the 4-bit red gradation data DR and switches connection and unconnection between two terminals according to a value of the bit data B4. One terminal of the fourth switch element SW4 is connected to the drain terminal of the fourth output side transistor To4 and the other terminal thereof is connected to the input terminal of the second current source CS2. In this embodiment, the two terminals are connected when the bit data B4 is "1" and are not connected when the bit data 4 is "0".

The second current source CS2 is a variable-gain constant current source that receives the threshold current command voltage Vapc1 as an input and generates the threshold current Ith (=H2·Vapc1) as the product of the threshold current command voltage Vapc1 and the coefficient H2. The input terminal of the second current source CS2 is connected to the other terminals of the first to fourth switch elements SW1 to SW4 and a drain terminal and a gate terminal of the second input side transistor Ti2. An output terminal thereof is connected to the ground line.

The second input side transistor Ti2 is a p-channel MOS transistor. A source terminal of the second input side transistor Ti2 is connected to the power supply line Vcc, a gate terminal thereof is connected to a drain terminal thereof and a gate terminal of the fifth output side transistor To5, and the drain terminal thereof is connected to the input terminal of the second current source CS2 and the other terminals of the first to fourth switch elements SW1 to SW4.

The fifth output side transistor To5 is a p-channel MOS transistor. A source terminal of the fifth output side transistor To5 is connected to the power supply line Vcc, the gate terminal thereof is connected to the gate terminal and the drain terminal of the second input side transistor Ti2, and a drain terminal thereof is connected to an anode terminal of the red laser beam source 30R.

The second input side transistor Ti2 and the fifth output side transistor To5 configure a current mirror circuit having the second input side transistor Ti2 on an input side and having the fifth output side transistor To5 on an output side. The second input side transistor Ti2 and the fifth output side transistor To5 receive, as an input, an added-up current of the threshold current Ith generated by the second current source CS2 and the electric current (the gradation current Id) flowing to the other terminals of the first to fourth switch elements SW1 to SW4 and output an electric current having a current value substantially the same as that of the added-up current to the red laser beam source 30R as the laser driving current IR.

The laser drivers 20G and 20B for the other colors are configured as explained below. The green laser driver 20G receives, as inputs, the green gradation data DG and the threshold current command voltage Vapc1 and the gradation current command voltage Vapc2 outputted from the correction system circuit block for green (not shown). The green laser driver 20G generates the laser driving current IG corresponding to the green gradation data DG using the threshold current command voltage Vapc1 and the gradation current command voltage Vapc2 and outputs the laser driving current IG to the green laser beam source 30G. The blue laser driver 20B receives, as inputs, the blue gradation data DB and the threshold current command value Vapc1 and the gradation current command voltage Vapc2 outputted from the correction system circuit block for blue (not shown). The blue laser driver 20B generates the laser driving current IB corresponding to the blue gradation data DB using the threshold current command voltage Vapc1 and the gradation current command voltage Vapc2 and outputs the laser driving current IB to the blue laser beam source 30B. Detailed configurations of the green laser driver 20G and the blue laser driver 20B are the same as that of the red laser driver 20R shown in FIGS. 5 and 6. Therefore, explanation of the detailed configurations is omitted.

The red laser beam source 30R (FIG. 4) includes a semiconductor laser element 31R and a wavelength converting element 32. The semiconductor laser element 31R emits, as light LRi having first wavelength, light of a near infrared ray toward the wavelength converting element 32 according to the laser driving current IR from the red laser driver 20G. The wavelength converting element 32 is an element (an SHG element) that causes a phenomenon of second harmonic generation (SHG). The "phenomenon of second harmonic generation" means a secondary nonlinear optical phenomenon in which two photons are converted into one photon having a double frequency. The light LRi having the first wavelength is converted into the laser beam LR (visible light), which is light having half wavelength of the first wavelength, by the wavelength converting element 32. The laser beam LR is emitted along the optical axis LA (FIG. 1) via the optical system for optical axis alignment 40 (not shown) explained above.

The photoelectric conversion element 90 is, for example, a photodiode. The photoelectric conversion element 90 is arranged with a light receiving surface thereof directed to the optical axis LA and outputs a current signal ILR corresponding to a light amount of the laser beam LR to the I/V converter 91. The I/V converter 91 converts the current signal ILR inputted from the photoelectric conversion element 90 into a voltage signal VLR and outputs the voltage signal VLR to the analog square root circuit 99. The analog square root circuit 99 outputs a square root signal VLRi equivalent to a square root of the inputted voltage signal VLR to the A/D converter 92. The A/D converter 92 converts the square root signal VLRi into digital data (infrared light amount measurement data) Dpd and outputs the digital data Dpd to the light-amount correcting circuit 93. In the light source device 100, light amount correction for the laser beam source 30R is performed by using the value equivalent to the square root of the light amount detected by the photoelectric conversion element 90. A reason for this is explained below.

Figure 7A:
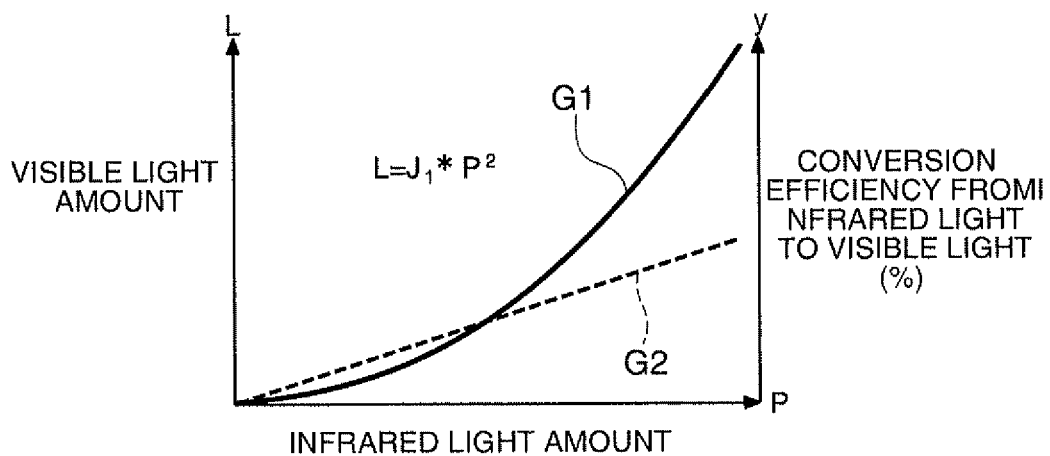
FIGS. 7A to 7C are diagrams for explaining a relation between a light emission amount of a laser beam source and infrared light emitted by the laser beam source.

FIG. 7A is a graph (a solid line graph G1) of a relation between an infrared light amount P and a visible light amount L. The "infrared light amount P" means a light amount of the infrared light LRi as the laser beam of the near infrared ray emitted by the semiconductor laser element 31R. On the other hand, the "visible light amount L" means a light amount of the laser beam LR converted and emitted by the wavelength converting element 32. In FIG. 7A, a graph (a broken line graph G2) indicating a relation between the infrared light amount P and conversion efficiency y (=L/P) of conversion from infrared light to visible light by the wavelength converting element 32 is shown to overlap the solid line graph G1.

As explained above, the wavelength conversion by the wavelength converting element 32 makes use of a secondary nonlinear optical effect. Therefore, as shown in the graph G1, the infrared light amount P and the visible light amount L have a nonlinear relation. More specifically, the visible light amount L is proportional to the square of the infrared light amount P (L=J1*P^2; J1 is a constant). Therefore, the infrared light amount P and the conversion efficiency y are in a substantially proportional relation (the graph G2).

Figure 7B:
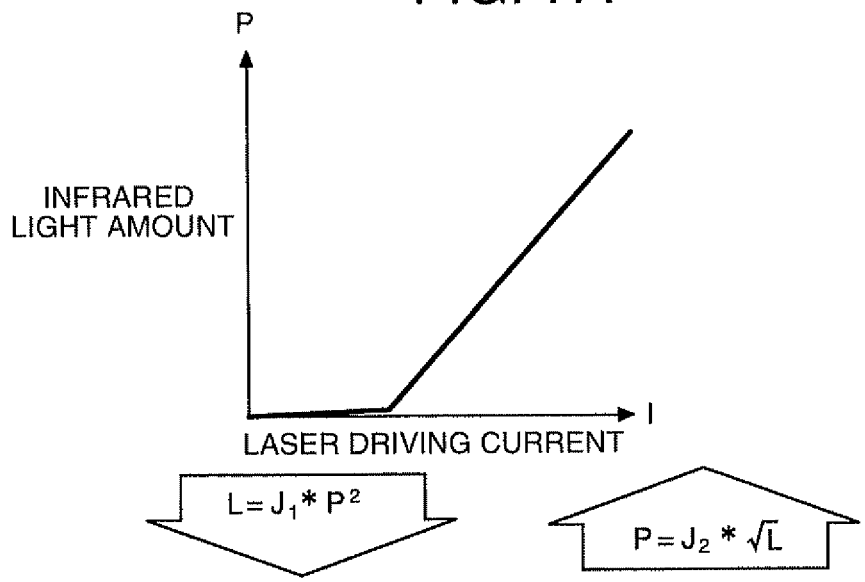

FIG. 7B is a graph of a relation between the laser driving current IR supplied to the semiconductor laser element 31R and the infrared light amount P emitted according to the laser driving current IR. In general, when a driving current larger than the threshold current Ith is supplied, a light amount of light emitted by a semiconductor laser increases in proportion to a current amount of the driving current. The infrared light amount P emitted by the semiconductor laser element 31R also increases in proportion to a laser driving current I larger than the threshold current Ith.

Figure 7C:
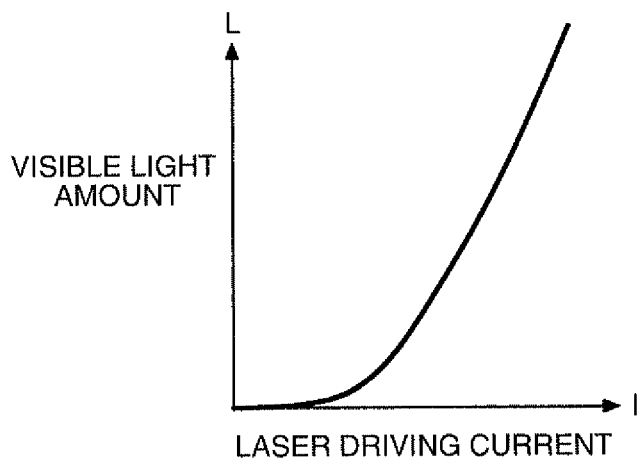

FIG. 7C is a graph of a relation between the laser driving current IR supplied to the semiconductor laser element 31R and the visible light amount L emitted according to the laser driving current IR. The graph can be obtained by raising the infrared light amount P shown in FIG. 7B to the second power. Conversely, it is seen that the infrared light amount P of the semiconductor laser element 31R can be measured by measuring the visible light amount L of the laser beam source 30R and calculating a square root of the visible light amount L.

The light source device 100 shown in FIG. 4 converts, with the analog square root circuit 99, the voltage signal VLR equivalent to the visible light amount L into the voltage signal VLRi equivalent to the infrared light amount P and supplies a signal Dpd obtained by further A/D-converting the voltage signal VLRi to the light-amount correcting circuit 93. The light-amount correcting circuit 93 executes light amount correction for the laser beam source 30R using the signal Dpd (i.e., a measured value of the infrared light amount P). As explained above, since the infrared light amount P and the laser driving current I are in the linear relation, the correction processing can be easily performed.

Figure 8:
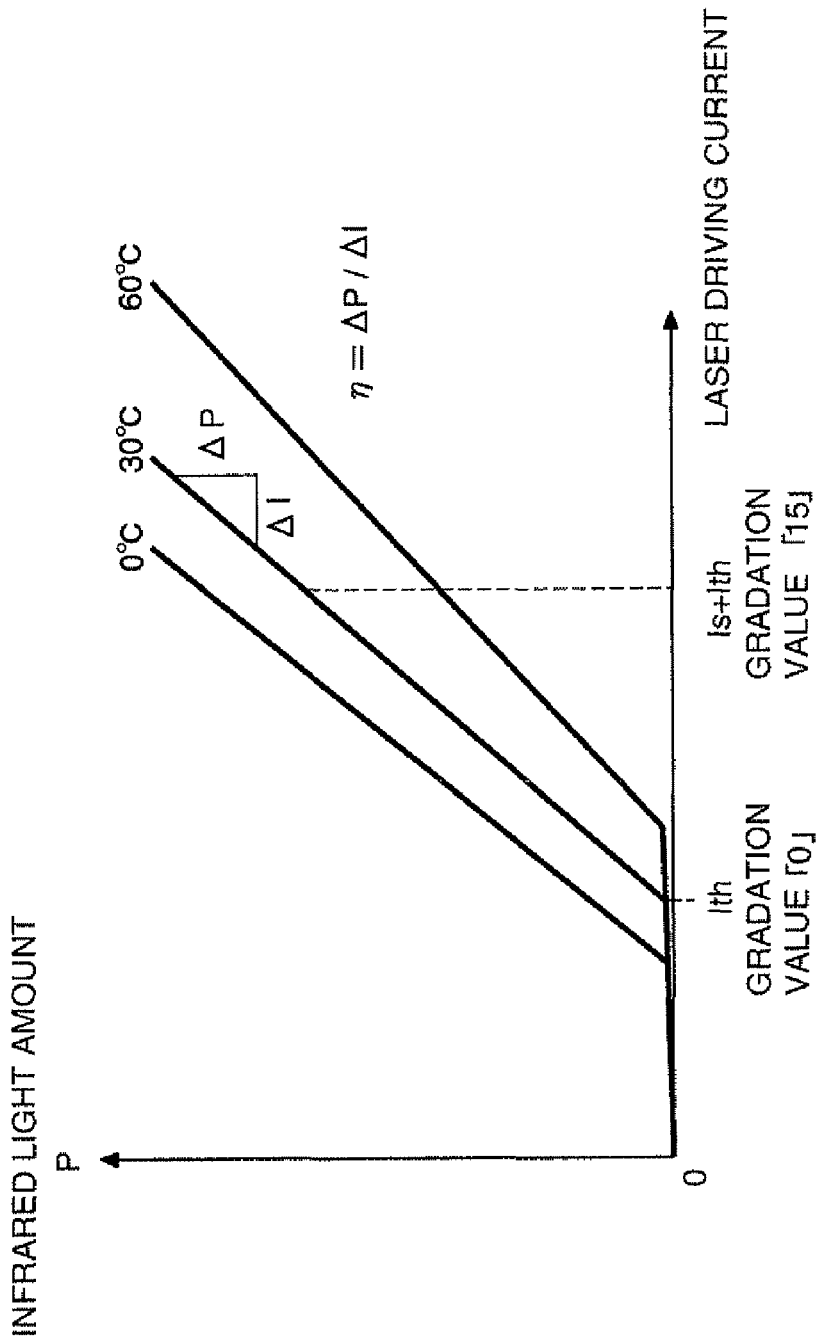
FIG. 8 is a graph of a laser characteristic of a red laser beam source.

FIG. 8 is a laser characteristic graph for explaining a relation between the infrared light amount P and the laser driving current IR for each of operating temperatures of the laser beam source 30R. As shown in FIG. 8, when the laser driving current IR is equal to or smaller than the threshold current Ith, the infrared light amount P is relatively very small. However, when the laser driving current IR increases to be larger than the threshold current Ith, the infrared light amount P increases in proportion to a current value (the gradation current Id) obtained by subtracting the threshold current Ith from the laser driving current IR.

More specifically, for example, when the red gradation data DR has a gradation value "0", i.e., all the bit data B1 to B4 are "0", all the first to fourth switch elements SW1 to SW4 are in the unconnected state. Therefore, the gradation current Id=0 and the laser driving current IR=Ith. In this case, as shown in FIG. 8, the infrared light LRi is not generated in the semiconductor laser element 31R (i.e., black display). When the red gradation data DR has a gradation value "1", i.e., the bit data B1 is "1" and the bit data B2 to B4 are "0", only the first switch element SW1 is in the connected state. Therefore, the gradation current Id=Is/15 and the laser driving current IR=Ith+Is/15. In this case, the infrared light LRi having the infrared light amount P corresponding to the gradation current Id=Is/15 obtained by subtracting the threshold current Ith from the laser driving current IR is generated in the semiconductor laser element 31R.

When the red gradation data DR has a gradation value "2", i.e., the bit data B2 is "1" and the bit data B1, B3, and B4 are "0", only the second switch element SW2 is in the connected state. Therefore, the gradation current Id=2·Is/15 and the laser driving current IR=Ith+2·Is/15. In this case, the infrared light LRi having the infrared light amount P corresponding to the gradation current Id=2·Is/15 obtained by subtracting the threshold current Ith from the laser driving current IR is generated in the semiconductor laser element 31R.

In this way, every time the gradation value increases by "1", the laser driving current IR increases by Is/15. In the case of a maximum gradation value "15", i.e., when all the bit data B1 to B4 are "1", all the first to fourth switch elements SW1 to SW4 are in the connected state. Therefore, the gradation current Id=Is and the laser driving current IR=Ith+Is. In this case, as shown in FIG. 8, the infrared light LRi having the infrared light amount P corresponding to the gradation current Id=Is obtained by subtracting the threshold current Ith from the laser driving current IR (an infrared light amount corresponding to the maximum gradation value) is generated in the semiconductor laser element 31R.

Since the gradation current Id depends not only on the gradation current command voltage Vapc2 but also on the gradation value D indicated by the red gradation data DR, the gradation current Id can be represented as Id=H1·Vapc2·D.

As it is seen from FIG. 8, the laser characteristic has temperature dependency. The threshold current Ith changes according to a temperature change. A tilt of the laser characteristic (a light amount change amount ΔP with respect to a current change amount ΔI) also changes according to the temperature change. In the following explanation, the tilt of the laser characteristic is represented as differential efficiency η (=ΔP/ΔI). As explained later in detail, in order to perform light amount correction according to a change in the laser characteristic, the threshold current Ith and the differential efficiency η only have to be corrected.

In explaining a detailed configuration of the light-amount correcting circuit 93, a principle of light amount correction in this embodiment as a premise of the explanation of the detailed configuration is explained.

A target infrared light amount T is represented as T=M·D and an actual infrared light amount P is represented as P=a·D+b. D is a gradation value indicated by gradation data of each of the colors, M is a coefficient, and "a" and "b" are variables ("a" is a first variable and "b" is a second variable).

As shown in FIG. 9A, when a target infrared light amount corresponding to a certain gradation value Dk is represent as Tk and an infrared light amount is represented as Pk, a difference between Pk and Tk is represented by an infrared light amount error δk. A basic idea of light amount correction in this embodiment is to set the threshold current command value Dapc1 and the gradation current command value Dapc2 to minimize the infrared light amount error δk.

In FIG. 9B, the laser characteristic changes and the variable "b" of the infrared light amount P increase. In FIG. 9C, the laser characteristic changes and the variable "b" of the infrared light amount P decreases. In FIG. 9D, the laser characteristic changes and the variable "a" of the infrared light amount P increases. In FIG. 9E, the laser characteristic changes and the variable "a" of the infrared light amount P decreases. The variable "b" is a variable corresponding to the threshold current Ith and the variable "a" is a variable corresponding to the differential efficiency η. Therefore, it is seen that the threshold current Ith only has to be corrected in the case of FIGS. 9B and 9C and the differential efficiency η only has to be corrected in the case of FIGS. 9D and 9E. In other words, the threshold current Ith is corrected according to the threshold current command value Dapc1 and the differential efficiency η is corrected according to the gradation current command value Dapc2.

As explained above, in order to set the threshold current command value Dapc1 and the gradation current command value Dapc2, it is necessary to measure an infrared light amount error δ (=P−T) between the target infrared light amount T corresponding to a certain gradation value D and the infrared light amount P as a measured value. When the number of times of this measurement is small, inaccuracy of a set value due to a measurement error occurs. Therefore, it is desirable to increase the number of times of measurement and sequentially improve measurement accuracy. In this embodiment, a method of least squares employing a steepest descent method that can search a minimum value of a square sum of infrared light amount errors δ sequentially and at highest speed is used.

When a procedure for setting the gradation value D and measuring the infrared light amount P is repeated to a k-th gradation value D, infrared light amounts with respect to gradation values {D1, D2, . . . , Di, . . . , and Dk} are represented as {P1, P2, . . . Pi, . . . , and Pk} and target infrared light amounts with respect to the gradation values are represented as {T1, T2, . . . , Ti, . . . , and Tk}. An evaluation function εk is represented as a square sum of infrared light amount errors as indicated by Formula (1). Variables "a" and "b" that minimize the evaluation function εk are sequentially calculated for each "i". When a tilt due to a change in the variables "a" and "b" is calculated and a steepest descent method for correcting "a" and "b" in the direction of the tilt is used, ak and bk can be represented by Formula (2) and Formula (3). In Formula (2) and Formula (3), μa and μb are coefficients.

$$\varepsilon_k = \sum_{i=1}^{k} (P_i - T_i)^2 \tag{1}$$

$$a_k = a_{k-1} - \frac{\mu_a}{2} * \frac{\partial \varepsilon_k}{\partial a} \tag{2}$$

$$b_k = b_{k-1} - \frac{\mu_b}{2} * \frac{\partial \varepsilon_k}{\partial b} \tag{3}$$

In Formula (2), ∂εk/∂a is represented by Formula (4). In Formula (3), ∂εk/∂b is represented by Formula (5). Therefore, Formula (6) is derived from Formula (2) and Formula (4). Formula (7) is derived from the Formula (3) and the Formula (5). Moreover, when the formulas are transformed such that the calculation can be sequentially performed, Formula (8) to Formula (12) are obtained.

$$\frac{\partial \varepsilon_k}{\partial a} = \frac{\partial}{\partial a}\left\{\sum_{i=1}^{k}(P_i - T_i)^2\right\} \quad (4)$$

$$= \frac{\partial}{\partial a}\left\{\sum_{i=1}^{k}(a*D_i + b - T_i)^2\right\}$$

$$= 2*\sum_{i=1}^{k}(a*D_i + b - T_i)*D_i$$

$$= 2*\sum_{i=1}^{k}(P_i - T_i)*D_i$$

$$= 2*\sum_{i=1}^{k}\delta_i*D_i$$

$$\frac{\partial \varepsilon_k}{\partial b} = \frac{\partial}{\partial b}\left\{\sum_{i=1}^{k}(P_i - T_i)^2\right\} \quad (5)$$

$$= \frac{\partial}{\partial b}\left\{\sum_{i=1}^{k}(a*D_i + b - T_i)^2\right\}$$

$$= 2*\sum_{i=1}^{k}(a*D_i + b - T_i)$$

$$= 2*\sum_{i=1}^{k}(P_i - T_i)$$

$$= 2*\sum_{i=1}^{k}\delta_i$$

Here, $\delta_i = P_i - T_i$ $$a_k = a_{k-1} - \mu_a * \sum_{i=1}^{k}\delta_i * D_i \quad (6)$$

$$b_k = b_{k-1} - \mu_b * \sum_{i=1}^{k}\delta_i \quad (7)$$

$$\delta_k = P_k - M * D_k \quad (8)$$

$$a_k = a_{k-1} - \mu_a * Sa_k \quad (9)$$

$$Sa_k = Sa_{k-1} + \delta_k * D_k \quad (10)$$

$$b_k = b_{k-1} - \mu_b * Sb_k \quad (11)$$

$$Sb_k = Sb_{k-1} + \delta_k \quad (12)$$

The variable "b" is a variable corresponding to the threshold current Ith and the variable "a" is a variable corresponding to the differential efficiency η. Therefore, it is sent that, as indicated by Formula (10), the differential efficiency η only has to be corrected according to an integrated value of a product of an infrared light amount error and a gradation value and, as indicated by Formula (12), the threshold current Ith only has to be corrected according to an integrated value of the infrared light amount error.

FIG. 10 is a graph for explaining, as a comparative example, correction processing performed by the correction method using the visible light amount L. It is assumed that correction processing same as the correction method is executed in a light source device in which the analog square root circuit 99 shown in FIG. 4 is omitted. In FIG. 10, the visible light amount L with respect to the gradation value D after the correction processing is shown. The correction method is a method of controlling the gradation value D and a target value of a visible light amount to be in a linear relation indicated by a broken line graph GLa. Therefore, even if the visible light amount L is corrected to approximate to the broken line graph GLa, as a result of the correction, a black level after the correction has an offset (a minimum value L0 of the solid line graph GL). In an image display apparatus, since, in general, high contrast of a displayed image is required to be realized, it is undesirable that the black level is set higher than the target value in this way. Therefore, as in this embodiment, if the light amount correction is executed by using the infrared light amount P, it is possible to set the black level closer to the target value and prevent contrast of a displayed image from falling.

A method of converting the principle of correction explained above into a circuit is explained below.

Figure 11:
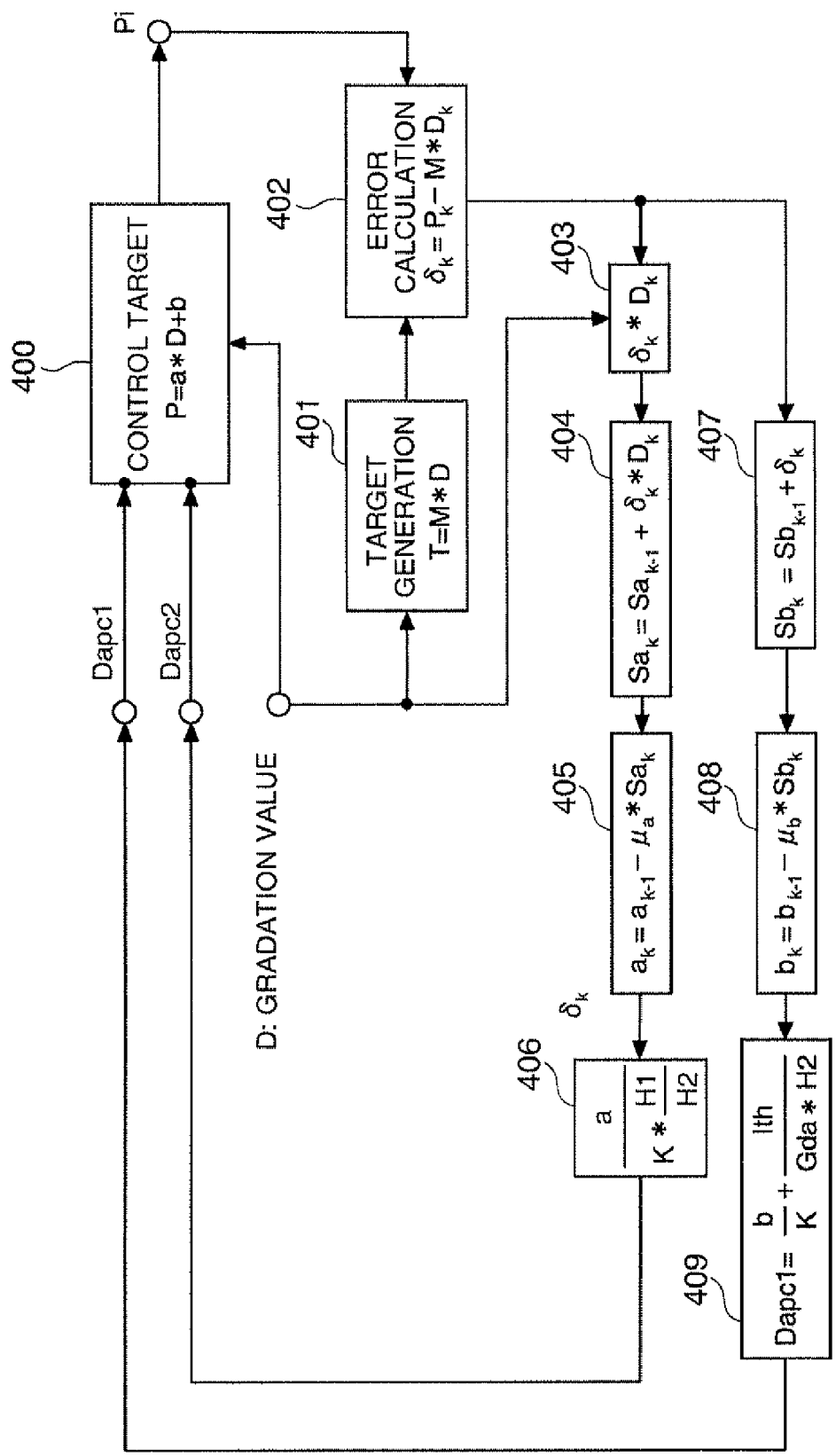
FIG. 11 is a block diagram of an internal configuration of the light-amount correcting circuit.

First, the method is illustrated as shown in FIG. 11. With the laser driver, the laser beam source, the photoelectric conversion element 90, and the like arranged between the D/A converters 94 and 95 and the A/D converter 92 set as a control target 400, the threshold current command value Dapc1 and the gradation current command value Dapc2 are calculated from the infrared light amount P and the gradation value D.

The control target 400 is explained. The laser driving current I, a laser beam amount W, an output current Ipd of the photoelectric conversion element 90, an output voltage VL of the I/V converter 91 and the analog square root circuit 99, an output value P of the A/D converter 92, the threshold current command voltage Vapc1, and the gradation current command voltage Vapc2 are represented as indicated by Formula 13 to Formula 19. In Formula 13 to Formula 19, H1, H2, F, Kpd, R, Gad, and Gda are coefficients.

$$I = H1*Vapc2*D + H2*Vapc1 \quad (13)$$

$$W = F*(I - I_{th}) \quad (14)$$

$$Ipd = Kpd*W \quad (15)$$

$$VL = R*Ipd \quad (16)$$

$$P = Gad*VL \quad (17)$$

$$Vapc1 = Gda*Dapc1 \quad (18)$$

$$Vapc2 = Gda*Dapc2 \quad (19)$$

When the other formulas are sequentially substituted in Formula (17), Formula (20) is obtained. On the other hand, since the output value P is defined as P=a·D+b as explained above, the variable "a" is represented by Formula (21) from Formula (20) and the variable "b" is represented by Formula (22). Formula (23) as a conversion formula for converting ak after correction into the gradation current command value Dapc2 is obtained in a converting element 406 by transforming Formula (21). Formula (24) as a conversion formula for converting bk after correction into the threshold current command value Dapc1 is obtained in a variable converting element 409 by transforming Formula (22).

$$P = Gad * VL = Gad * R * Ipd \quad (20)$$
$$= Gad * R * Kpd * W$$
$$= Gad * R * Kpd * F * \{I - I_{th}\}$$
$$= Gad * R * Kpd * F * \left\{ \begin{array}{l} H1 * Vapc2 * D + \\ H2 * Vapc1 - I_{th} \end{array} \right\}$$
$$= Gad * R * Kpd * F * \left\{ \begin{array}{l} H1 * Gda * Dapc2 * D + \\ H2 * Gda * Dapc1 - I_{th} \end{array} \right\}$$
$$= Gad * R * Kpd * F * Gda * H2 * \left\{ \begin{array}{l} \dfrac{H1}{H2} * Dapc2 * D + \\ Dapc1 - \dfrac{I_{th}}{Gda * H2} \end{array} \right\}$$
$$= K * \left\{ \dfrac{H1}{H2} * Dapc2 * D + Dapc1 - \dfrac{I_{th}}{Gda * H2} \right\}$$

Here, $K = Gad * R * Kpd * F * Gda * H2$ $$a = K * \frac{H2}{H1} * Dapc2 \quad (21)$$

$$b = K * \left\{ Dapc1 - \frac{I_{th}}{Gda * H2} \right\} \quad (22)$$

$$Dapc2 = \frac{a \cdot H2}{K \cdot H1} \quad (23)$$

$$Dapc1 = \frac{b}{K} + \frac{I_{th}}{Gda * H2} \quad (24)$$

Figure 12A:
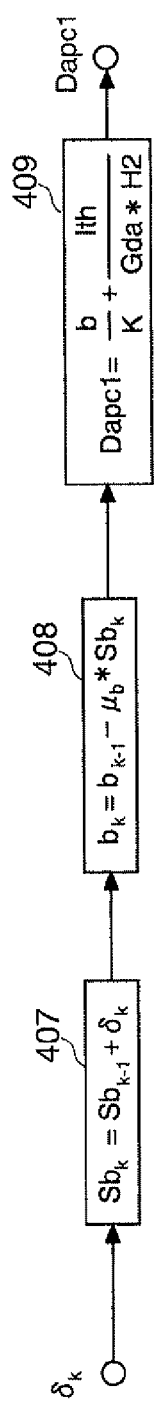
FIGS. 12A to 12D are block diagrams of an internal configuration of a part of the light-amount correcting circuit.
Figure 12B:
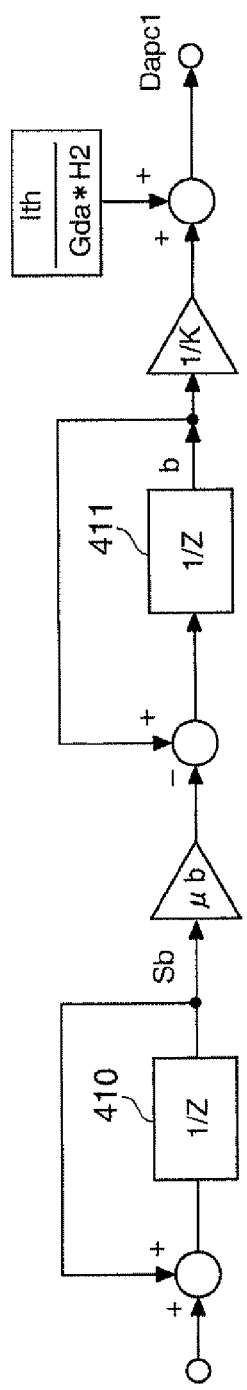
Figure 12C:
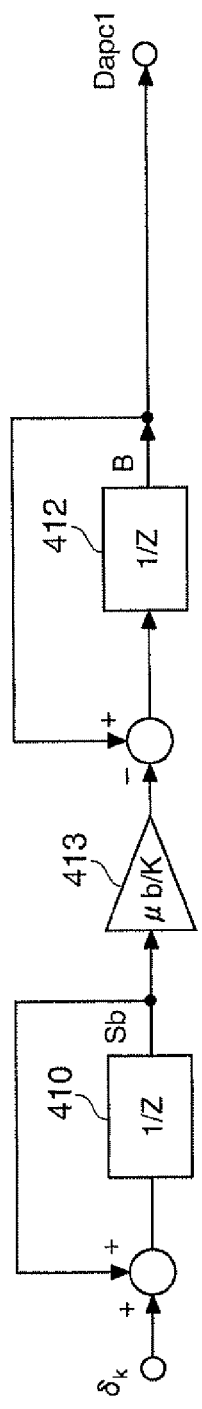

When attention is directed to a section for calculating the threshold current command value Dapc1, as shown in FIG. 12A, an error integrating element 407, a correcting element 408, and a variable converting element 409 are connected in series. These elements are directly represented as a block diagram by using delay elements 410 and 411 as shown in FIG. 12B. The delay element 410 performs integration of an error and the delay element 411 performs sequential correction for the parameter "b". In order to simplify the block diagram, Formula (11) is transformed into Formula (25). When "b" of Formula (25) is subjected to variable conversion by Formula (26), Formula (27) is obtained. Formula (27) is represented by a block diagram as shown in FIG. 12C. When an output of the delay element 410 is multiplied with μb/K by a gain element 413 and sent to a delay element 412, an operation equivalent to that shown in FIG. 12B is performed.

$$\frac{b_k}{K} + \frac{I_{th}}{Gda * H2} = \frac{b_{k-1}}{K} + \frac{I_{th}}{Gda * H2} - \frac{\mu_b}{K} * Sb_k \quad (25)$$

$$B_k = \frac{b_k}{K} + \frac{I_{th}}{Gda * H2} \quad (26)$$

$$B_k = B_{k-1} - \frac{\mu_b}{K} * Sb_k \quad (27)$$

Figure 12D:
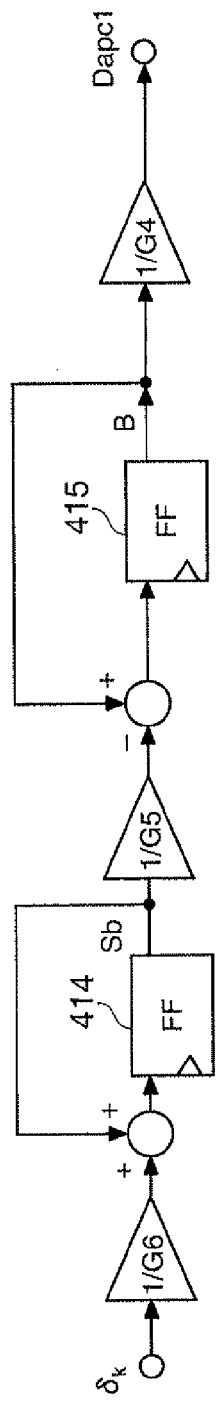

In order to realize the delay elements with flip-flops, it is necessary to prevent cancellation of an arithmetic operation. Therefore, the delay elements are replaced with the flip-flops after operators for gain adjustment are inserted in various places. Consequently, a configuration shown in FIG. 12D is obtained. To perform equivalent operations in FIGS. 12C and 12D, the respective gains only have to satisfy a relation indicated by Formula (28). An output of a flip-flop 414 is a variable obtained by scaling Sbk. An output of a flip-flop 415 is a variable obtained by subjecting bk to variable conversion. However, to avoid complication, in the following explanation, the outputs may be represented as Sbk and bk, respectively.

$$\frac{\mu_b}{K} = \frac{1}{G4} \cdot \frac{1}{G5} \cdot \frac{1}{G6} \quad (28)$$

Figure 13A:
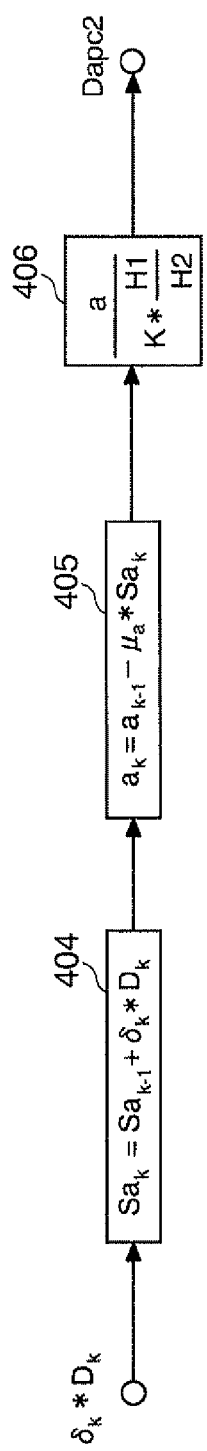
FIGS. 13A to 13D are block diagrams of an internal configuration of a part of the light-amount correcting circuit.
Figure 13B:
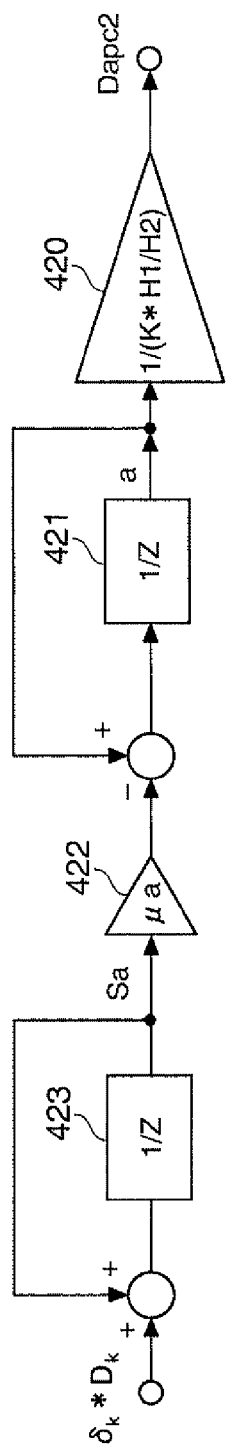
Figure 13C:
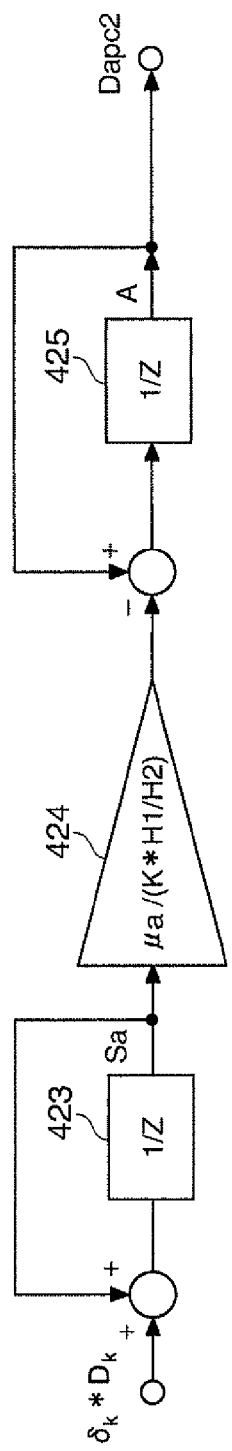

Subsequently, attention is directed to a section for calculating the gradation current command value Dapc2 shown in FIG. 11. When this section is extracted, as shown in FIG. 13A, an error integrating element 404, a correcting element 405, and a variable converting element 406 are connected in series. The elements are represented as a block diagram by using delay elements as shown in FIG. 13B. It is seen from the figure that operations between an input and an output are the same even if the gain element 420 is moved to change a configuration as shown in FIG. 13C. This is realized by transforming Formula (9) into Formula (29) and replacing the variables in Formula (30) to obtain Formula (31).

$$\frac{a_k}{(K * H1/H2)} = \frac{a_{k-1}}{(K * H1/H2)} - \frac{\mu_a}{(K * H1/H2)} * Sa_k \quad (29)$$

$$A_k = \frac{a_k}{(K * H1/H2)} \quad (30)$$

$$A_k = A_{k-1} - \frac{\mu_a}{(K * H1/H2)} * Sa_k \quad (31)$$

Figure 13D:
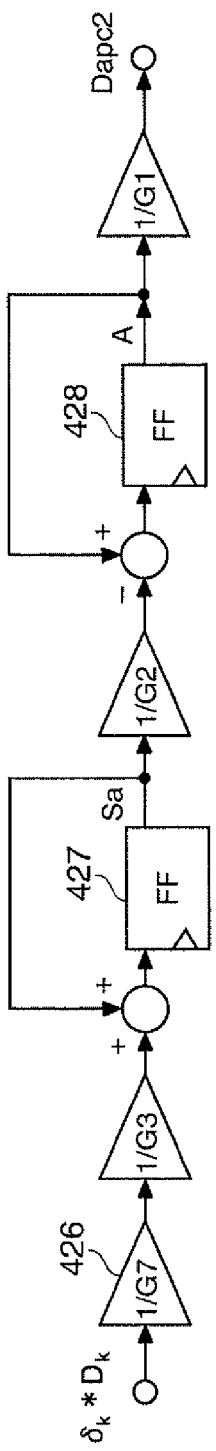

In the same manner as explained above, the delay elements are replaced with flip-flops after gains are inserted in various places. Consequently, a configuration shown in FIG. 13D is obtained. A gain element 426 is inserted for gain adjustment for common use of a circuit. When the respective gains satisfy Formula (32), equivalent operations are performed in FIGS. 13C and 13D. An output of a flip-flop 427 is a variable obtained by scaling Sak. An output of a flip-flop 428 is a variable obtained by scaling ak. However, to avoid complication, in the following explanation, the outputs may be represented as Sak and ak, respectively.

$$\frac{\mu_a}{K \cdot \dfrac{H1}{H2}} = \frac{1}{G7} \cdot \frac{1}{G1} \cdot \frac{1}{G2} \cdot \frac{1}{G3} \quad (32)$$

Figure 14:
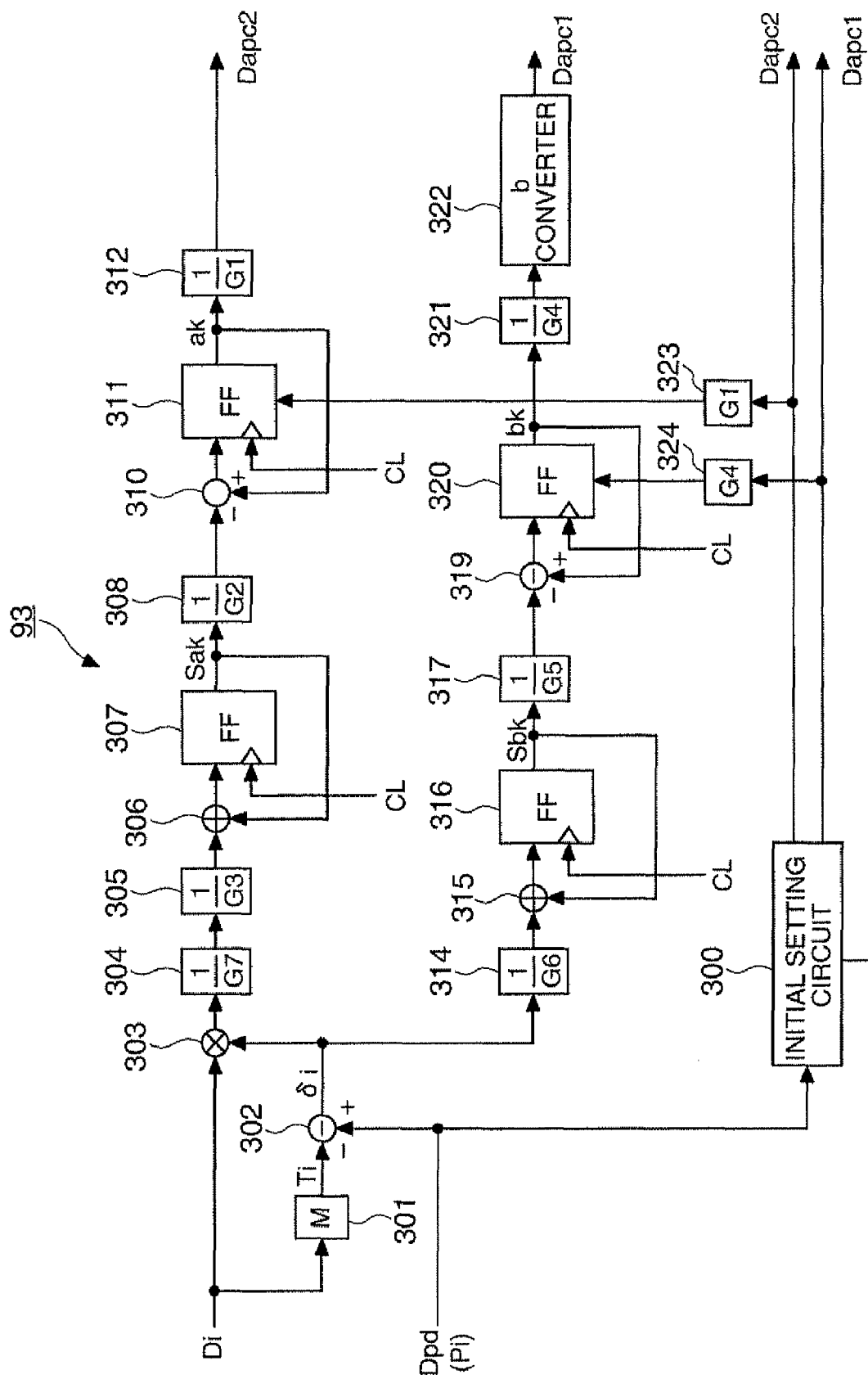
FIG. 14 is a schematic diagram of a detailed configuration of the light-amount correcting circuit.

With the principle of the light amount correction in this embodiment as a premise, a detailed configuration of the light-amount correcting circuit 93 is explained below with reference to FIG. 14. As shown in FIG. 14, the light-amount correcting circuit 93 includes an initial setting circuit 300, an M multiplier 301, a subtracter 302, a multiplier 303, a G7 divider 301, a G3 divider 305, an adder 306, a flip-flop 307, a G2 divider 308, a subtracter 310, a flip-flop 311, a G1 divider 312, a G6 divider 314, an adder 315, a flip-flop 316, a G5 divider 317, a subtracter 319, a flip-flop 320, a G4 subtracter 321, a b converter 322, a G1 multiplier 323, and a G4 multiplier 324.

The initial setting circuit 300 performs, during power-on or reset of the image display apparatus LSD, a predetermined initial setting operation by adjusting the threshold current command value Dapc1 and the gradation current command value Dapc2 on the basis of an infrared light amount measured value Pi indicated by the light amount measurement data Dpd. The initial setting circuit 300 has a function of outputting the gradation data DR, DG, and DB of the respective colors used during the initial setting operation to the laser drivers 20R, 20G, and 20B for the respective colors. Details of the initial setting operation are explained later.

The M multiplier 301 outputs a product of a gradation value Di indicated by the gradation data DR, DG, and DB of the respective colors and a coefficient M to the subtracter 302 as a target infrared light amount Ti (=M·Di). The subtracter 302 outputs a value obtained by subtracting the target infrared light amount Ti from the infrared light amount measured value Pi to the multiplier 303 and the G6 divider 314 as an infrared light amount error δi (=Pi−Ti).

The multiplier 303 outputs a product of the gradation value Di and the infrared light amount error δi (hereinafter referred to as moment MTi) to the G7 divider 304. The G7 divider 304 outputs a value obtained by dividing the moment MTi by a coefficient G7 to the G3 divider 305. The G3 divider 305 outputs a value obtained by dividing the output value (MTi/G7) of the G7 divider 304 by a coefficient G3 to the adder 306.

The adder 306 outputs an added-up value of the output value (MTi/(G7·G3)) of the G3 divider 305 and the output value of the flip-flop 307 to a D input terminal of the flip-flop 307. The flip-flop 307 is a D-type flip-flop. The flip-flop 307 reflects the input value to the D input terminal as an output value in synchronization with the pixel synchronization clock signal CL. An integrating circuit for the moment MTi (=δi·Di) is configured by the adder 306 and the flip-flop 307. The output value of the flip-flop 307 is an integrated value of the moment MTi. The integrated value of the moment MTi is represented as Sak below. Sak=δ1·D1+ . . . +δi·Di+ . . . + δk·Dk.

The G2 divider 308 outputs a value obtained by dividing the integrated value Sak of the moment MTi by a coefficient G2 to the subtracter 310. The subtracter 310 outputs a value obtained by subtracting the output value (=Sak/G2) of the G2 divider 308 from the output value of the flip-flop 311 to a D input terminal of the flip-flop 311. The flip-flop 311 is a D-type flip-flop. The flip-flop 311 reflects the input value to the D input terminal as an output value in synchronization with the pixel synchronization clock signal CL. As an initial output value ak−1 of the flip-flop 311, a value obtained by the G1 multiplier 323 multiplying the gradation current command value Dapc2, which is initially set by the initial setting circuit 300, with a coefficient G1 is loaded. A correcting circuit for calculating ak=ak−1−μa·Sak represented by Formula (9) is configured by the subtracter 310 and the flip-flop 311. An output value of the flip-flop 311 is ak.

The G1 divider 312 outputs a value obtained by dividing the output value ak of the flip-flop 311 by the coefficient G1 to the D/A converter 95 as the gradation current command value Dapc2.

The G6 divider 314 outputs a value obtained by dividing the infrared light amount error δi by a coefficient G6 to the adder 315. The adder 315 outputs an added-up value of the output value (=δi/G6) of the G6 divider 314 and the output value of the flip-flop 316 to a D input terminal of the flip-flop 316. The flip-flop 316 is a D-type flip-flop. The flip-flop 316 reflects the input value to the D input terminal as an output value in synchronization with the pixel synchronization clock signal CL. An integrating circuit for the infrared light amount error δi is configured by the adder 315 and the flip-flop 316. The output value of the flip-flop 316 is an integrated value of the infrared light amount error δi. The integrated value of the infrared light amount error δi is represented as Sbk below. Sbk=δ1+ . . . +δi . . . +δk.

The G5 divider 317 outputs a value obtained by dividing the integrated value Sbk of the infrared light amount error δi by a coefficient G5 to the subtracter 319. The subtracter 319 outputs a value obtained by subtracting the output value (=Sbk/G5) of the G5 divider 317 from the output value of the flip-flop 320 to a D input terminal of the flip-flop 320. The flip-flop 320 is a D-type flip-flop. The flip-flop 320 reflects the input value to the D input terminal as an output value in synchronization with the pixel synchronization clock signal CL. As an initial output value bk−1 of the flip-flop 320, a value obtained by the G4 multiplier 324 multiplying the threshold current command value Dapc1, which is initially set by the initial setting circuit 300, with a coefficient G4 is loaded. A correcting circuit for calculating bk=bk−1−μb·Sbk represented by Formula (11) is configured by the subtracter 319 and the flip-flop 320. The output value of the flip-flop 320 is bk.

The G4 divider 321 outputs a value obtained by dividing the output value bk of the flip-flop 320 by the coefficient G4 to the D/A converter 94 as the threshold current command value Dapc1. By providing the G7 divider 304, it is possible to set the coefficient as G3=G6, G2=G5, and G1=G4, common use of the circuit is possible, and it is possible to reduce a circuit size.

The light-amount correcting circuit 93 is explained above. Referring back to FIG. 4, the light source device 100 is explained again.

The D/A converter 94 converts the threshold current command value Dapc1 inputted from the light-amount correcting circuit 93 into the threshold current command voltage Vapc1 (=Gda·Dapc1) and outputs the threshold current command voltage Vapc1 to the red laser driver 20R. The D/A converter 95 converts the gradation current command value Dapc2 inputted from the light-amount correcting circuit 93 into the gradation current command voltage Vapc2 (=Gda·Dapc2) and outputs the gradation current command voltage Vapc2 to the red laser driver 20R. The correction system circuit block for red is explained above as a representative one. However, the explanation is applied to the correction system circuit blocks for green and blue as well.

Operations of the image display apparatus LSD according to this embodiment configured as explained above are explained below. In the following explanation, the correction system circuit block for red is explained as a representative one. However, the explanation is applied to the correction system circuit blocks for green and blue as well.

Initial Setting Operation During Power-On

Figure 15:
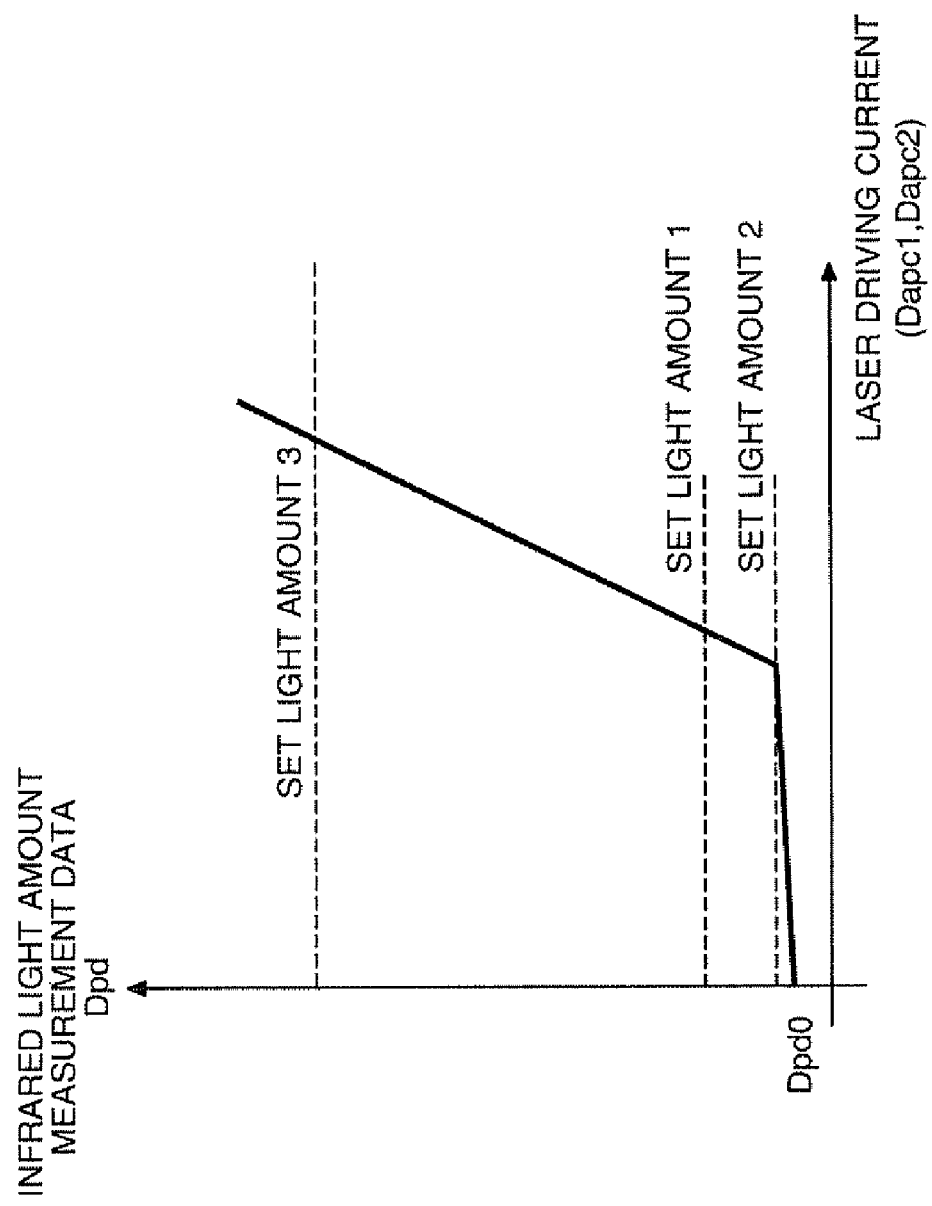
FIG. 15 is a graph for explaining an initial setting operation executed by the light-amount correcting circuit.

First, an initial setting operation by the initial setting circuit 300 of the light-amount correcting circuit 93 during power-on is explained. FIG. 15 is a characteristic graph of a correspondence relation between Dpd as an output of the A/D converter 92 (i.e., the infrared light amount measured value P of the red laser beam source 30R) and a laser driving current. As shown in FIG. 15, it is seen that, although a characteristic curve itself is the same as that shown in FIG. 8, an offset occurs in Dpd because of an offset of the I/V converter 91. The initial setting operation by the initial setting circuit 300 during power-on is performed in order to correct the offset superimposed on this Dpd.

Figure 16:
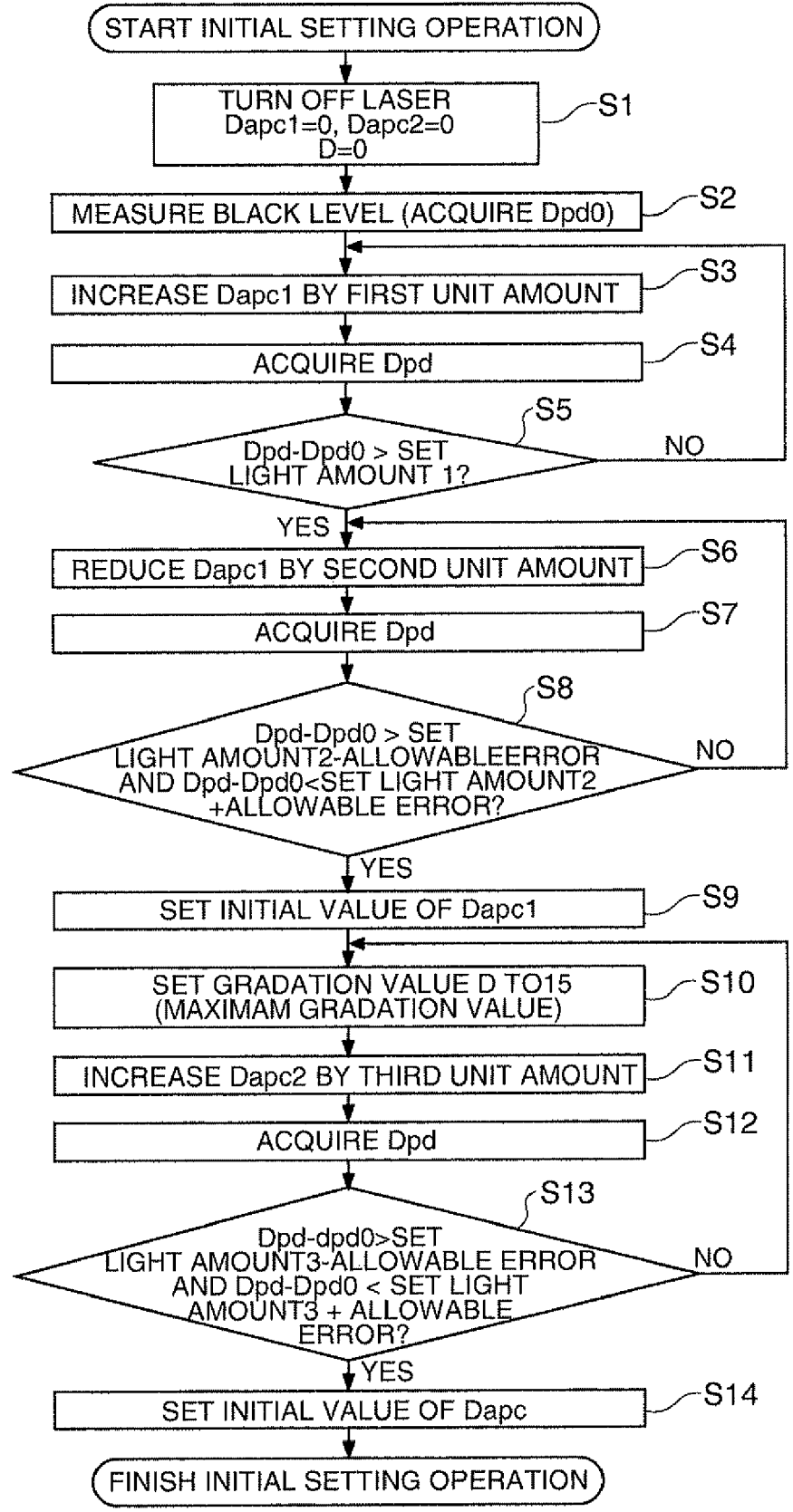
FIG. 16 is a flowchart of the initial setting operation executed by the light amount correcting circuit.

FIG. 16 is a flowchart of the initial setting operation by the initial setting circuit 300 of the light-amount correction circuit 93. First, in order to completely turn off the red laser beam source 30R, the initial setting circuit 300 sets the threshold current command value Dapc1 and the gradation current command value Dapc2 to 0 and outputs the red gradation data DR indicating that the gradation value D is 0 to the red laser driver 20R (step S1). Consequently, the laser driving current IR supplied from the red laser driver 20R to the red laser beam source 30R is completely reduced to zero and the red laser beam source 30R is completely turned off. At this point, the initial setting circuit 300 acquires Dpd, which is inputted from the A/D converter 92, as a measured value Dpd0 of a black level (step S2).

Subsequently, the initial setting circuit 300 increases the threshold current command value Dapc1 by a first unit amount (step S3) and acquires Dpd at this point (step S4). The initial setting circuit 300 determines whether a value of Dpd−Dpd0 is larger than a set light amount 1 set in a clear light emission state shown in FIG. 15 (step S5). When the value of Dpd−Dpd0 is not larger than the set light amount 1 in step S5 ("NO" in step S5), the initial setting circuit 300 returns to step S3 and repeats the processing in steps S3 to S5.

On the other hand, when the value of Dpd−Dpd0 is larger than the set light amount 1 ("YES" in step S5), the initial setting circuit 300 reduces the threshold current command value Dapc1 by a second unit amount (step S6) and acquires Dpd at this point (step S7). The initial setting circuit 300 determines whether a condition that a value of Dpd−Dpd0 is larger than an amount obtained by subtracting an allowable error from a set light amount 2 (Dpd−Dpd0>set light amount 2−allowable error) and the value of Dpd−Dpd0 is smaller than an amount obtained by adding up the set light amount 2 and the allowable error (Dpd−Dpd0<set light amount 2+allowable error) is satisfied (step S8). When the condition is not satisfied in step S8 ("NO" in step S8), the initial setting circuit 300 returns to step S6 and repeats the processing in steps S6 to S8. The set light amount 2 is set to a value regarded as a black level as shown in FIG. 15.

On the other hand, when the condition is satisfied in step S8 ("YES" in step S8), the initial setting circuit 300 sets a value of Dapc1 at that point as an initial value of the threshold current command value Dapc1 (step S9). At the same time, the initial setting circuit 300 outputs the initial value of the threshold current command value Dapc1 to the G4 multiplier 324. A value obtained by the G4 multiplier 324 multiplying the initial value of the threshold current command value Dapc1 with the coefficient G4 is loaded to the flip-flop 320 as an initial output value bk−1 of the flip-flop 320.

Subsequently, the initial setting circuit 300 outputs the red gradation data DR indicating the gradation value D=15 (i.e., the maximum gradation value) to the red laser driver 20R (step S10), increases the gradation current command value Dapc2 by a third unit amount (step S11), and acquires Dpd at this point (step S12). The initial setting circuit 300 determines whether a condition that a value of Dpd−Dpd0 is larger than an amount obtained by subtracting an allowable error from a set light amount 3 (Dpd−Dpd0>set light amount 3−allowable error) and the value of Dpd−Dpd0 is smaller than an amount obtained by adding up the set light amount 3 and the allowable error (Dpd−Dpd0<set light amount 3+allowable error) (step S13). When the condition is not satisfied in step S13 ("NO" in step S13), the initial setting circuit 300 returns to step S10 and repeats the processing in steps S10 to S13. The set light amount 3 is set to a target value of a maximum light emission amount as shown in FIG. 15.

On the other hand, when the condition is satisfied in step S13 ("YES" in step S13), the initial setting circuit 300 sets a value of Dapc2 at that point as an initial value of the gradation current command value Dapc2 (step S14). At the same time, the initial setting circuit 300 outputs the initial value of the gradation current command value Dapc2 to the G1 multiplier 323. A value obtained by the G1 multiplier 323 multiplying the initial value of the threshold current command value Dapc2 with the coefficient G1 is loaded to the flip-flop 311 as an initial output value ak−1 of the flip-flop 311. According to the initial setting operation explained above, the initial value of the threshold current command value Dapc1 and the initial value of the gradation current command value Dapc2 with the offset superimposed on Dpd corrected are set.

The initial setting operation explained above is performed in the correction system circuit blocks for green and blue in the same manner.

Steady Operation

Subsequently, operations at the steady time of the image display apparatus LSD are explained with reference to a timing chart of FIG. 17.

It is assumed that video signals and synchronization signals (a vertical synchronization signal Vsync and a horizontal synchronization signal Hsync) have already been inputted from an external image supply apparatus and the video-signal processing circuit 10 (FIG. 1) has generated, on the basis of the video signals and the synchronization signals, digital gradation data for specifying gradation values corresponding to respective pixels of an image that should be displayed and has stored the digital gradation data in an internal memory in one frame units.

It is assumed that the reflection mirror 50a of the laser scanning unit 50 starts rotation according to a scanning driving signal outputted from the scanning driving unit 60 when the synchronization signals are inputted, the rotation angle θ2 with respect to the vertical scanning direction of the reflection mirror 50a coincides with an angle corresponding to a start position of one frame on the screen 200 at time t1, and, at time t2, the rotation angle θ1 with respect to the horizontal scanning direction of the reflection mirror 50a coincides with an angle corresponding to a start portion of one horizontal scanning period on the screen 200. At time t1, a frame timing signal Ft for specifying the start of one frame is outputted from the timing-signal generating circuit 70c. At time t2, a scanning timing signal St for specifying the start of one horizontal scanning period is outputted from the timing-signal generating circuit 70c. Further, it is assumed that, at time t3, the rotation angle θ1 with respect to the horizontal scanning direction of the reflection mirror 50a coincides with an angle corresponding to an end position of one horizontal scanning period on the screen 200. At time t3, a scanning timing signal St for specifying the end of one horizontal scanning period is outputted from the timing-signal generating circuit 70c.

At time t2, when the scanning timing signal St for specifying the start of one horizontal scanning period is inputted, the pixel-synchronization-clock generating circuit 80 generates the pixel synchronization clock signal CL for specifying irradiation timing of the laser beams LR, LG, and LB corresponding to the respective pixels in one horizontal scanning period and outputs the pixel synchronization clock signal CL to the video-signal processing circuit 10 and the light-amount correcting circuit 93. As explained above, the rotation angle θ1 in one horizontal scanning period, i.e., the irradiation position Qx is in the unconditional relation with time elapsed from the start of one horizontal scanning period. Therefore, naturally, the irradiation position Qx corresponding to the respective pixels in one horizontal scanning period and the elapsed time are in the unconditional relation. Therefore, in this embodiment, as shown in FIG. 17, after the scanning timing signal St for specifying the start of one horizontal scanning period is inputted, the pixel-synchronization-clock generating circuit 80 generates, according to the elapsed time, the pulse-like pixel synchronization clock for specifying irradiation timing of the laser beams LR, LG, and LB corresponding to the respective pixels on the basis of the unconditional relation between the irradiation position Qx corresponding to the respective pixels in one horizontal scanning period and the elapsed time.

Figure 17:
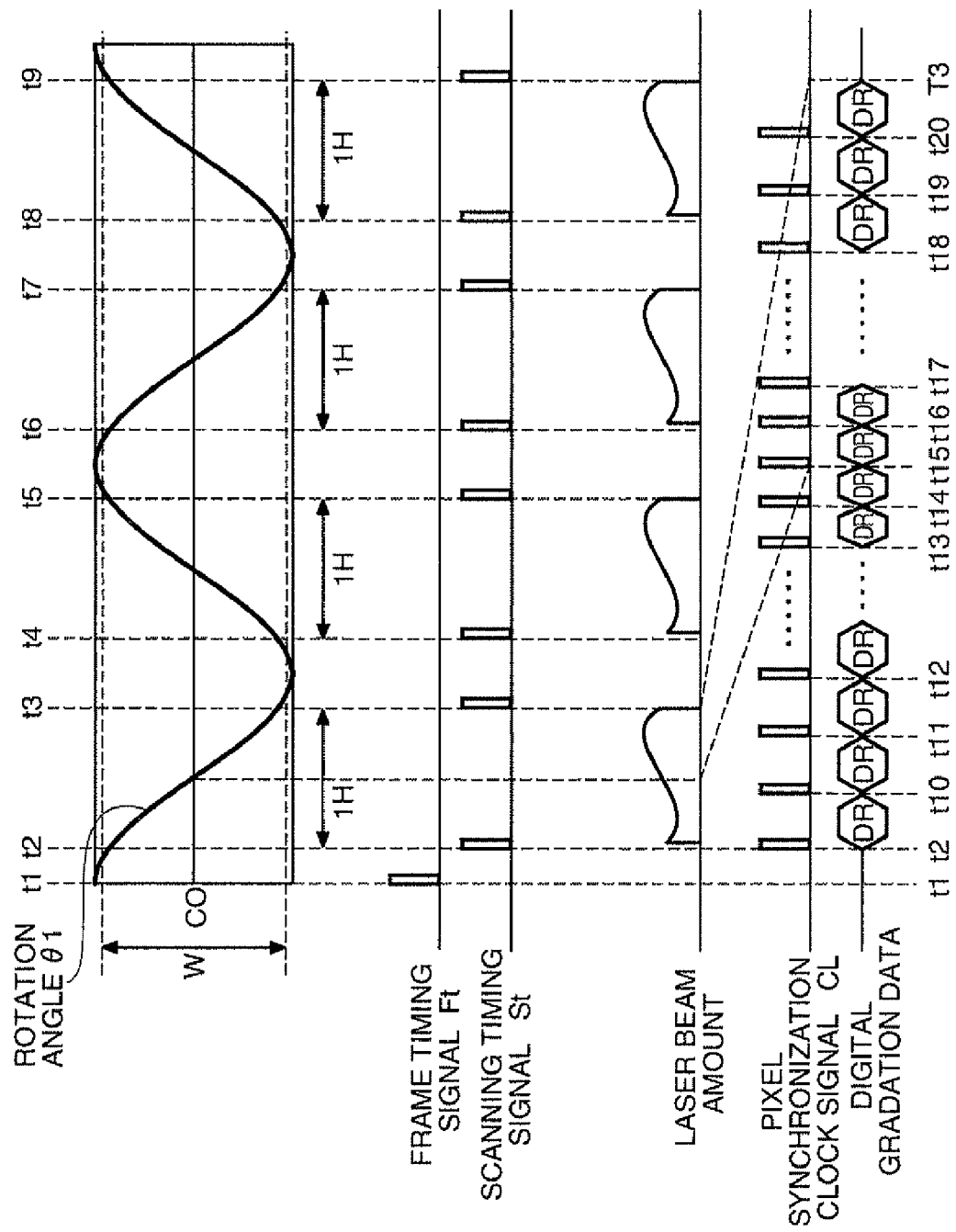
FIG. 17 is a timing chart of a steady operation of the image display apparatus.

As it is seen from FIG. 17, a pulse interval of the pixel synchronization clock signal CL changes according to the irradiation position Qx, i.e., the elapsed time. For example, the pulse interval is short near time t13 to t17 around the center of the screen 200 and is long around both the ends of the screen 200. This is because the speed of change in the rotation angle θ1 (scanning speed) of the reflection mirror 50a changes in a sine wave shape according to the elapsed time from the viewpoint of a characteristic of the laser scanning unit 50 as the MEMS scanner.

On the other hand, when the frame timing signal Ft for specifying the start of one frame and the scanning timing signal St for specifying the start of one horizontal scanning period are inputted, the video-signal processing circuit 10 reads out the digital gradation data (the red gradation data DR, the green gradation data DG, and the blue gradation data DB) of the respective pixels corresponding to a horizontal scanning period in a first row from a storage area in which digital gradation data of a first frame in the internal memory is stored. The video-signal processing circuit 10 sequentially outputs the red gradation data DR, the green gradation data DG, and the blue gradation data DB in synchronization with the pixel synchronization clock signal CL. Specifically, as shown in FIG. 17, when the first pixel synchronization clock signal CL is inputted at time t2, the video-signal processing circuit 10 outputs the red gradation data DR for a red pixel corresponding to the start position (a first column) of one horizontal scanning period to the red laser driver 20R and the light-amount correcting circuit 93. For convenience of explanation, attention is directed to the red gradation data DR.

A gradation value indicated by the red gradation data DR inputted to the light-amount correcting circuit 93 is represented as D1. An infrared light amount measured value indicated by the infrared light amount measurement data Dpd outputted from the A/D converter 92 to the light-amount correcting circuit 93 is represented as P1. In this case, in the light-amount correcting circuit 93 shown in FIG. 14, an output value of the M multiplier 301 is $T1=M \cdot D1$, an output value of the subtracter 302 is $\delta 1 = P1 - M \cdot D1$, an output value of the multiplier 303 is $D1 \cdot \delta 1$, an output value of the flip-flop 307 is $Sa1 = D1 \cdot \delta 1$, and an output value of the flip-flop 311 is $a1 = a0$ (the initial value of the gradation current command value Dapc2) $-\mu a \cdot Sa1$. Such an output value a1 is outputted to the D/A converter 95 as the gradation current command value Dapc2, converted into the gradation current command voltage Vapc2 by the D/A converter 95, and outputted to the first current source CS1 of the red laser driver 20R.

On the other hand, an output value of the flip-flop 316 is $Sb1 = \delta 1$ and an output value of the flip-flop 320 is $b1 = b0$ (the initial value of the threshold current command value Dapc1) $-\mu b \cdot Sb1$. Such an output value b1 is outputted to the D/A converter 94 as the threshold current command value Dapc1, converted into the threshold current command voltage Vapc1 by the D/A converter 94, and outputted to the second current source CS2 of the red laser driver 20R.

Consequently, the red gradation data DR for a red pixel corresponding to the start position (the first column) of one horizontal scanning period, the gradation current command voltage Vapc2, and the threshold current command voltage Vapc1 are inputted to the red laser driver 20R. Therefore, a laser driving current represented by $IR = H2 \cdot Vapc2 \cdot D1 + H1 \cdot Vapc1$ is generated and supplied to the red laser beam source 30R. With the laser driving current, the red laser beam source 30R generates the laser beam LR corresponding to a gradation value of the red pixel in the first column. The laser beam LR is irradiated on the irradiation position Qx corresponding to the red pixel in the first column of one horizontal scanning period by the reflection mirror 50a.

Subsequently, as shown in FIG. 17, at time t0, a pixel synchronization clock signal corresponding to a second column of one horizontal scanning period is generated. The video-signal processing circuit 10 outputs the red gradation data DR for a red pixel corresponding to the second column of one horizontal scanning period to the red laser driver 20R and the light-amount correcting circuit 93.

A gradation value indicated by the red gradation data DR inputted to the light-amount correcting circuit 93 is represented as D2. An infrared light amount measured value indicated by the infrared light amount measurement data Dpd outputted from the A/D converter 92 to the light-amount correcting circuit 93 is represented as P2. In this case, in the light-amount correcting circuit 93 shown in FIG. 14, an output value of the M multiplier 301 is $T2 = M \cdot D2$, an output value of the subtracter 302 is $\delta 2 = P2 - M \cdot D2$, an output value of the multiplier 303 is $D2 \cdot \delta 2$, an output value of the flip-flop 307 is $Sa2 = D1 \cdot \delta 1 + D2 \cdot \delta 2$, and an output value of the flip-flop 311 is $a2 = a1 - \mu a \cdot Sa2$. Such an output value a2 is outputted to the D/A converter 95 as the gradation current command value Dapc2, converted into the gradation current command voltage Vapc2 by the D/A converter 95, and outputted to the first current source CS1 of the red laser driver 20R.

On the other hand, an output value of the flip-flop 316 is $Sb2 = \delta 1 + \delta 2$ and an output value of the flip-flop 320 is $b2 = b1 - \mu b \cdot Sb2$. Such an output value b2 is outputted to the D/A converter 94 as the threshold current command value Dapc1, converted into the threshold current command voltage Vapc1 by the D/A converter 94, and outputted to the second current source CS2 of the red laser driver 20R.

Consequently, the red gradation data DR for the red pixel corresponding to the second column of one horizontal scanning period, the gradation current command voltage Vapc2, and the threshold current command voltage Vapc1 are inputted to the red laser driver 20R. Therefore, a laser driving current represented by $IR = H2 \cdot Vapc2 \cdot D2 + H1 \cdot Vapc1$ is generated and supplied to the red laser beam source 30R. With the laser driving current, the red laser beam source 30R generates the laser beam LR corresponding to a gradation value of the red pixel in the second column. The laser beam LR is irradiated on the irradiation position Qx corresponding to the red pixel in the second column of one horizontal scanning period by the reflection mirror 50a.

Subsequently, as shown in FIG. 17, at time t11, a pixel synchronization clock signal corresponding to a third column of one horizontal scanning period is generated. The video-signal processing circuit 10 outputs the red gradation data DR for a red pixel corresponding to the third column of one horizontal scanning period to the red laser driver 20R and the light-amount correcting circuit 93.

A gradation value indicated by the red gradation data DR inputted to the light-amount correcting circuit 93 is represented as D3. An infrared light amount measured value indicated by the infrared light amount measurement data Dpd outputted from the A/D converter 92 to the light-amount correcting circuit 93 is represented as P3. In this case, in the light-amount correcting circuit 93 shown in FIG. 14, an output value of the M multiplier 301 is $T3 = M \cdot D3$, an output value of the subtracter 302 is $\delta 3 = P3 - M \cdot D3$, an output value of the multiplier 303 is $D3 \cdot \delta 3$, an output value of the flip-flop 307 is $Sa3 = D1 \cdot \delta 1 + D2 \cdot \delta 2 + D3 \cdot \delta 3$, and an output value of the flip-flop 311 is $a3 = a2 - \mu a \cdot Sa3$. Such an output value a3 is outputted to the D/A converter 95 as the gradation current command value Dapc2, converted into the gradation current command voltage Vapc2 by the D/A converter 95, and outputted to the first current source CS1 of the red laser driver 20R.

On the other hand, an output value of the flip-flop 316 is $Sb3 = \delta 1 + \delta 2 + \delta 3$ and an output value of the flip-flop 320 is b3=b2−μb·Sb3. Such an output value b3 is outputted to the D/A converter 94 as the threshold current command value Dapc1, converted into the threshold current command voltage Vapc1 by the D/A converter 94, and outputted to the second current source CS2 of the red laser driver 20R.

Consequently, the red gradation data DR for the red pixel corresponding to the third column of one horizontal scanning period, the gradation current command voltage Vapc2, and the threshold current command voltage Vapc1 are inputted to the red laser driver 20R. Therefore, a laser driving current represented by IR=H2·Vapc2·D3+H1·Vapc1 is generated and supplied to the laser beam source 30R. With the laser driving current, the red laser beam source 30R generates the laser beam LR corresponding to a gradation value of the red pixel in the third column. The laser beam LR is irradiated on the irradiation position Qx corresponding to the red pixel in the third column of one horizontal scanning period by the reflection mirror 50a.

The same operation is repeated to a final column of one horizontal scanning period (equivalent to time t20 shown in FIG. 17). An image in one horizontal scanning period from time t2 to t3 is displayed on the screen 200.

In FIG. 17, a period of time t4 to t5 indicates the next one horizontal scanning period (in a second row), a period of time t6 to t7 indicates one horizontal scanning period in a third row, and a period of time t8 to t9 indicates one horizontal scanning period in a fourth row. An operation same as that explained above is performed in each of horizontal scanning periods and one horizontal scanning period in a last row ends, whereby an image for one frame is displayed on the screen 200. It goes without saying that, every time one horizontal scanning period ends, the rotation angle θ2 in the vertical scanning direction of the reflection mirror 50a changes to an angle corresponding to the next horizontal scanning period.

In the above explanation, attention is directed to the red gradation data DR. However, the same light amount correction is applied to the green gradation data DG and the blue gradation data DB by the correction system circuit blocks corresponding thereto.

As explained above, the image display apparatus LSD according to this embodiment sequentially calculates the variables "a" and "b" for minimizing an infrared light amount error, which is a difference between a target infrared light amount and an infrared light amount measured value, while performing a display operation and sets, on the basis of the variables "a" and "b", the threshold current command value Dapc1, with which the threshold current Ith can be corrected, and the gradation current command value Dapc2, with which the differential efficiency η can be corrected. This makes it possible to perform, on a real time basis, light amount correction corresponding to a change in a laser characteristic due to a temperature change or the like during an operation and obtain high light amount correction accuracy. Therefore, it is possible to improve a display quality.

B. Modifications

The invention is not limited to the embodiment explained above. The invention can be carried out in various forms without departing from the spirit of the invention. For example, modifications explained below are possible.

B1. Modification 1

In the embodiment, a part of the components realized by hardware may be replaced with software. Conversely, a part of the components realized by software may be replaced with hardware.

B2. Modification 2

Figure 18A:
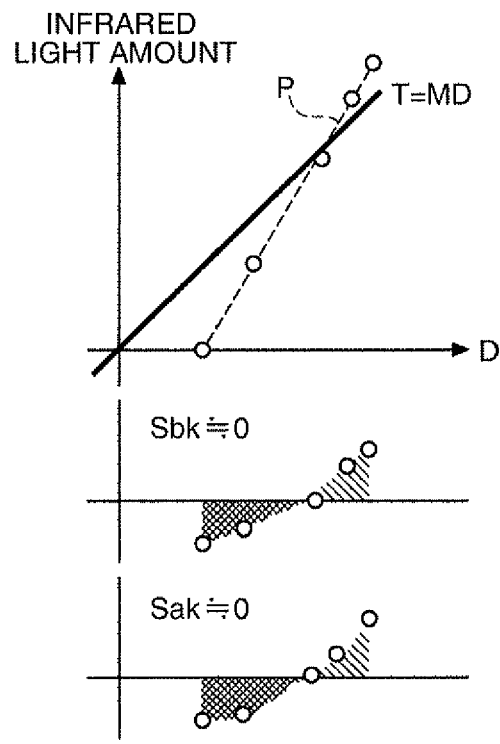
FIGS. 18A and 18B are graphs for explaining a modification of the image display apparatus.
Figure 18B:
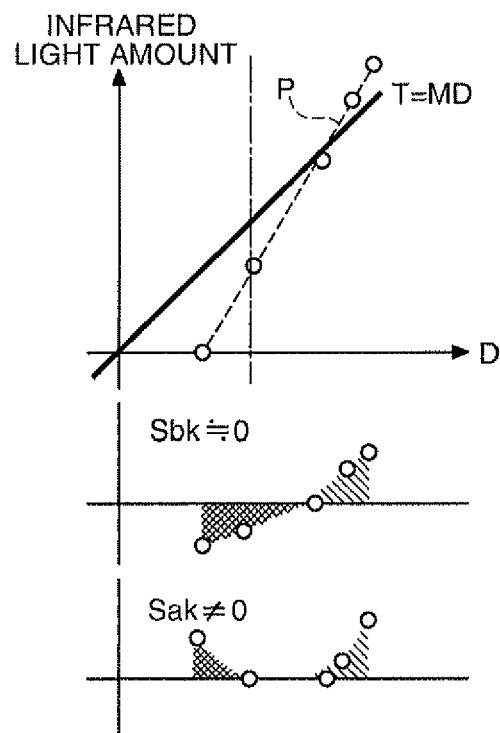

In the embodiment, when deviation of the infrared light amount measured value P with respect to the target infrared light amount T is in a state shown in FIG. 18A, the integrated value Sbk of the infrared light amount error and the integrated value Sak of the product of the infrared light amount error and the gradation value (the moment) decrease to substantially zero. Therefore, it is likely that a phenomenon in which the correction operation in the light-amount correcting circuit 93 stops may occur. In order to prevent such a phenomenon, as shown in FIG. 18B, a gradation value used in calculating a moment is set to an intermediate value between a minimum gradation value and a maximum gradation value. This makes it possible to prevent the integrated value Sak of the product of the infrared light amount error and the gradation value (the moment) from decreasing to substantially zero. Therefore, it is possible to prevent the correction operation in the light-amount correcting circuit 93 from stopping.

Figure 19:
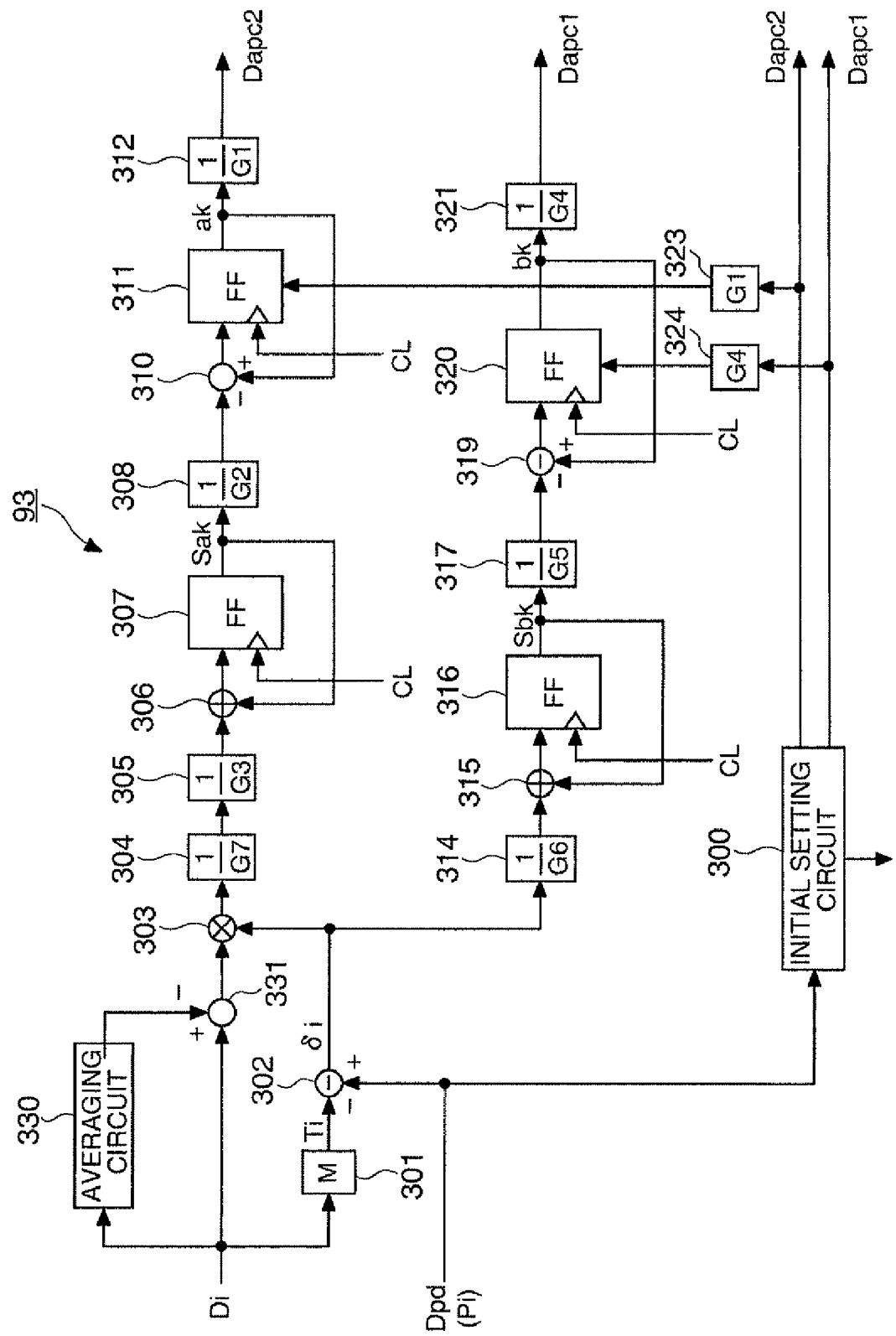
FIG. 19 is a diagram for explaining the modification of the image display apparatus.

Further, an average of gradation values is sequentially calculated and used as a gradation value used in calculating a moment. This also makes it possible to prevent the integrated value Sak of the product of the infrared light amount error and the gradation value (the moment) from decreasing to substantially zero. When this is explained by using a formula, instead of Formula (10), as indicated by Formula (33), an integrated value of a product of a difference between the gradation value Dk and a gradation average Dave and the infrared light amount error is calculated. In this case, as shown in FIG. 19, it is sufficient to provide, at a pre-stage of the multiplier 303, an averaging circuit 330 that sequentially calculates an average of the gradation value Di and a subtracter 331 that subtracts an output value (a gradation average) of the averaging circuit 330 from a gradation value. Not only the average but also a value set in advance, for example, if 8-bit gradation representation is possible, a gradation value "128" may be used in calculating a moment.

$$Sa_k = Sa_{k-1} + \delta_k * (D_k - D_{ave}) \quad (33)$$

B3. Modification 3

Figure 20:
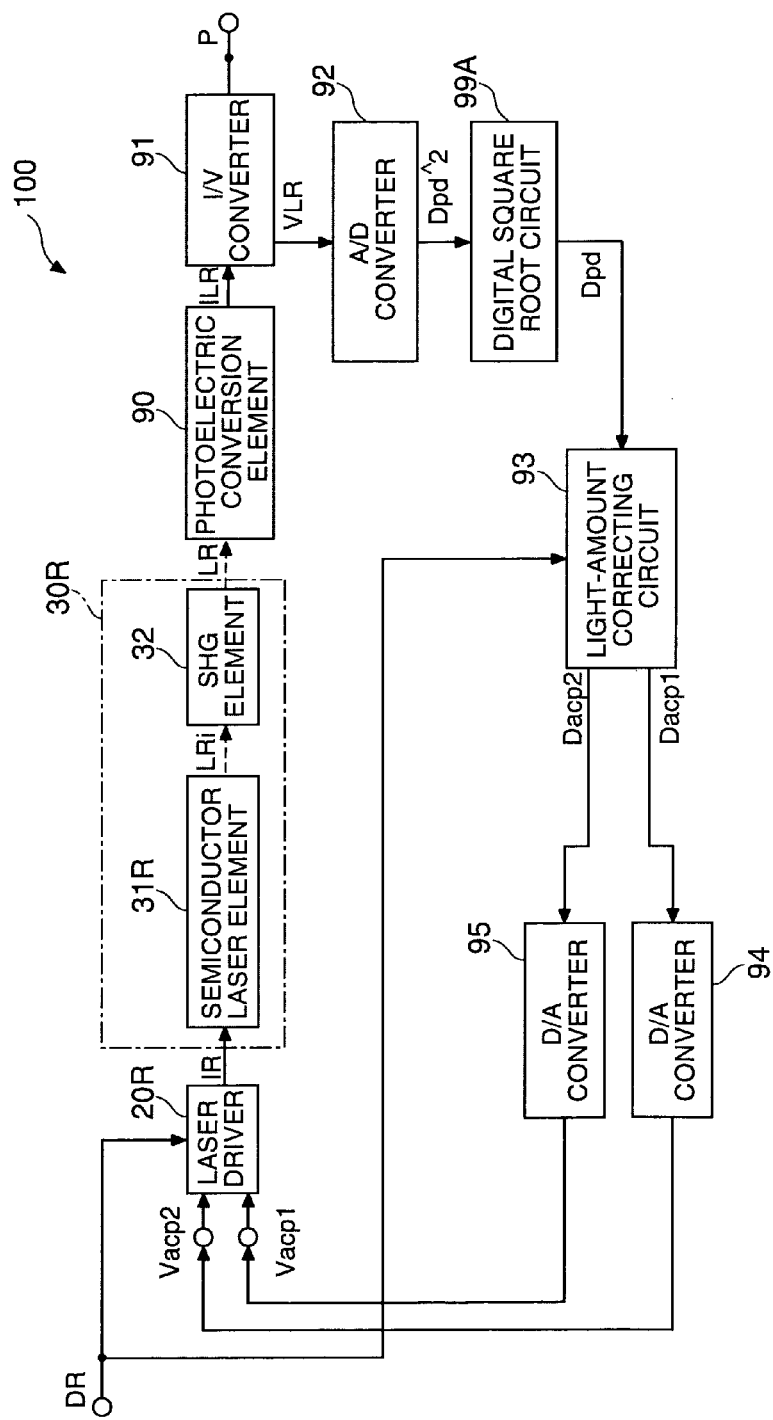
FIG. 20 is a diagram for explaining the modification of the image display apparatus.

In the embodiment, the light source device 100 includes the analog square root circuit 99 (FIG. 4). However, the light source device 100 may include a digital square root circuit instead of the analog square root circuit 99 (FIG. 20). In this case, as shown in FIG. 20, a digital square root circuit 99A is provided between the A/D converter 92 and the light-amount correcting circuit 93. Therefore, the voltage signal VLR equivalent to the measured light amount of the laser beam LR outputted by the I/V converter 91 is converted into digital data Dpd^2 by the A/D converter 92. The digital square root circuit 99A outputs digital data Dpd, which is a square root of the digital data Dpd^2, to the light-amount correcting circuit 93. With such a configuration, it is possible to obtain an effect same as that in the embodiment.

B4. Modification 4

In the embodiment, the light amount correction is performed during the display operation. However, it is likely that the light amount correction cannot be normally performed if there is deviation in a gradation value, for example, there is an extremely dark image. As measures against this problem, it is also possible that, in a period in which image display is not performed (a period in which a laser beam is not scanned on the screen 200) such as a period of time t3 to t4 and a period of time t5 to t6 shown in FIG. 17, a predetermined gradation value (gradation data) or a simulative pixel synchronization clock signal is generated by the video-signal processing circuit 10 to cause a laser beam source to emit light and perform a light amount correction operation in the light-amount correcting circuit 93.

B5. Modification 5

In the embodiment, when the integrated value Sbk of the infrared light amount error and the integrated value Sak of the product of the infrared light amount error and the gradation value (the moment) are calculated, it is desirable to attach importance to nearest data (a value of the product of the infrared light amount error and the gradation value). Therefore, weight of data in the past may be set low. Specifically, weighting constant multipliers only have to be provided in a feedback path extending from an output terminal of the flip-flop 307 to the adder 306 and a feedback path extending from an output terminal of the flip-flop 316 to the adder 315 shown in FIG. 14. This weighting constant is set to a value smaller than 1 such as ⅞. Consequently, data are sequentially forgotten from one in the past when the integrated value Sbk of the infrared light amount error and the integrated value Sak of the product of the infrared light amount error and the gradation value (the moment) are calculated. Therefore, it is possible to attach importance to nearest data.

In the embodiment, the variables "a" and "b" are sequentially corrected by the value proportional to the integrated value Sbk of the infrared light amount error and the integrated value Sak of the product of the infrared light amount error and the gradation value (the moment). However, the variables "a" and "b" may be corrected by a fixed value according to a sign of the integrated value Sbk and the integrated value Sak.

B6. Modification 6

In the embodiment, the laser scan display that scans a laser beam on the screen 200 to display an image is explained as the example. However, the invention is not limited to this. The invention can also be applied to an image display apparatus that scans light generated from an LED (Light Emitting Diode) or other light sources to display an image. In the embodiment, the laser scanner display that uses one scanner for the laser beam sources for the three colors is explained as the example. However, the invention is not limited to this. Scanners may be provided for the respective colors.

B7. Modification 7

The circuit configuration of the red laser driver 20R (the green laser driver 20G and the blue laser driver 20B) explained with reference to FIG. 6 in the embodiment may be changed as appropriate according to a maximum number of gradations. In the embodiment, since it is assumed that the maximum number of gradations is "16 (4 bits)", the four output side transistors (the first output side transistor To1 to the fourth output side transistor To4) are provided in the current mirror circuit shown in FIG. 6. However, for example, when the maximum number of gradations is set to "256 (8 bits)", eight output side transistors only have to be provided in the current mirror circuit (eight switch elements are also provided).

In this case, an electric characteristic of the output side transistor corresponding to bit data of a first bit only has to be set such that an electric current as small as 1/255 of the electric current Is is generated. An electric characteristic of the output side transistor corresponding to bit data of a second bit only has to be set such that an electric current as small as 2/255 of the electric current Is is generated. An electric characteristic of the output side transistor corresponding to bit data of a third bit only has to be set such that an electric current as small as 4/255 of the electric current Is is generated. An electric characteristic of the output side transistor corresponding to bit data of a fourth bit only has to be set such that an electric current as small as 8/255 of the electric current Is is generated. An electric characteristic of the output side transistor corresponding to bit data of a fifth bit only has to be set such that an electric current as small as 16/255 of the electric current Is is generated. An electric characteristic of the output side transistor corresponding to bit data of a sixth bit only has to be set such that an electric current as small as 32/255 of the electric current Is is generated. An electric characteristic of the output side transistor corresponding to bit data of a seventh bit only has to be set such that an electric current as small as 64/255 of the electric current Is is generated. An electric characteristic of the output side transistor corresponding to bit data of an eighth bit only has to be set such that an electric current as small as 128/255 of the electric current Is is generated.

B8. Modification 8

In the embodiment, the semiconductor laser element 31R irradiates the infrared light LRi as the light of the near infrared ray. However, light having other wavelengths may be emitted. In this case, the wavelength converting element 32 only has to convert light having the first wavelength emitted by the semiconductor laser element 31R into light having the second wavelength according to the secondary nonlinear optical effect and emit the light.

The entire disclosure of Japanese Patent Application No. 2008-56046, filed Mar. 6, 2008 is expressly incorporated by reference herein.

What is claimed is:

1. A light source device comprising:
a semiconductor light-emitting element that emits, according to an input value, light having a first wavelength;
a wavelength converting element that converts, with a nonlinear optical effect, the light having the first wavelength emitted by the semiconductor light-emitting element into light having a second wavelength;
a light-amount measuring unit that measures a light amount of the light having the second wavelength emitted from the wavelength converting element;
an equivalent-light-amount calculating unit that calculates, on the basis of the measured light amount measured by the light-amount measuring unit, an equivalent light amount equivalent to a light amount of the light having the first wavelength;
a light-amount correcting unit that corrects an emitted light amount of the semiconductor light-emitting element using the input value and the equivalent light amount; and
a current supplying unit that supplies a driving current to the semiconductor light-emitting element according to the input value and a command value outputted by the light-amount correcting unit, wherein
the light-amount correcting unit calculates an equivalent light amount error as a difference between the equivalent light amount and a target equivalent light amount that should be emitted by the semiconductor light-emitting element with respect to the input value, calculates, using an integrated value of a product of the equivalent light amount error and the input value, differential efficiency defined by an amount of change in the equivalent light amount with respect to an amount of change in the driving current, calculates, using an integrated value of the equivalent light amount error, a threshold current value of the semiconductor light-emitting element, and corrects the command value according to the differential efficiency and the threshold current value.

2. The light source device according to claim 1, wherein the command value includes a gradation current command value corrected according to the differential efficiency and a threshold current command value corrected according to the threshold current value, the current supplying unit includes:
- a gradation-current generating unit that generates a gradation current corresponding to the input value and the gradation current command value;
- a threshold-current generating unit that generates a threshold current corresponding to the threshold-current command value; and
- a current adding unit that adds up the gradation current and the threshold current and supplies an added-up current to the light-emitting unit as the driving current, and the light-amount correcting unit calculates a present value of a first variable representing the gradation current command value by subtracting a numerical value proportional to the integrated value of the product of the equivalent light amount error and the input value from a last value of the first variable and calculates a present value of a second variable representing the threshold current command value by subtracting a numerical value proportional to the integrated value of the equivalent light amount error from a last value of the second variable.

3. The light source device according to claim 2, wherein, as an initial setting operation for correcting an offset of a measured light amount of the light-amount measuring unit during power-on, after acquiring, as a black level light amount, the equivalent light amount for completely turning off the semiconductor light-emitting element at the time when the gradation current, the threshold current, and the input value are outputted to the current supplying unit, the light-amount correcting unit increases the threshold current and, when a value obtained by subtracting the black level light amount from the equivalent light amount reaches a first set light amount for specifying predetermined brightness, reduces the threshold current, and sets, as an initial value of the threshold current, the threshold current at the time when the value obtained by subtracting the black level light amount from the equivalent light amount reaches a second set light amount regarded as a black level, and outputs a maximum value of the input value to the current supplying unit, increases the gradation current, and sets, as an initial value of the gradation current, the gradation value at the time when the value obtained by subtracting the black level light amount from the equivalent light amount reaches a third set light amount for specifying a maximum target light amount.

4. The light source device according to claim 3, wherein the light-amount correcting unit uses, as the last value of the second variable in calculating a present value of the second variable in the first time, the initial value of the threshold current calculated by the initial setting operation and uses, as the last value of the first variable in calculating a present value of the first variable in the first time, the initial value of the gradation current.

5. The light source device according to claim 1, wherein the light-amount correcting unit uses, as an input value for calculation used in calculating the integrated value of the product of the equivalent light amount error and the input value, an average of the input value, an initially set input value set in advance, or a difference between a median value between a minimum input value and a maximum input value and the input value.

6. The light source device according to claim 1, wherein the light-amount correcting unit multiplies a value of the product of the equivalent light amount error and the input value with a weighting constant for setting the value smaller as the value is generated further in the past to thereby calculate an integrated value of the product of the equivalent light amount error and the input value.

7. An image display apparatus comprising the light source device according to claim 1, wherein
the input value is respective pixel data included in image data.

8. A method of controlling a semiconductor light-emitting element, the method comprising:
- causing the semiconductor light-emitting element to emit light having a first wavelength according to an input value;
- converting the light having the first wavelength into light having a second wavelength;
- detecting a light amount measured value as a measured value of a light amount of the light having the second wavelength;
- calculating an equivalent light amount equivalent to a light amount of the light having the first wavelength on the basis of the light amount measured value;
- correcting a light emission amount of the semiconductor light-emitting element using the input value and the equivalent light amount; and
- supplying a driving current to the semiconductor light-emitting element according to the input value and a command value determined in the correcting the light emission amount step, and wherein the correcting the light emission amount step includes calculating an equivalent light amount error as a difference between the equivalent light amount and a target equivalent light amount that should be emitted by the semiconductor light-emitting element with respect to the input value, calculating, using an integrated value of a product of the equivalent light amount error and the input value, differential efficiency defined by an amount of change in the equivalent light amount with respect to an amount of change in the driving current, calculating, using an integrated value of the equivalent light amount error, a threshold current value of the semiconductor light-emitting element, and correcting the command value according to the differential efficiency and the threshold current value.

* * * * *

UNITED STATES PATENT AND TRADEMARK OFFICE
CERTIFICATE OF CORRECTION

PATENT NO. : 8,053,713 B2
APPLICATION NO. : 12/363121
DATED : November 8, 2011
INVENTOR(S) : Tomio Ikegami It is certified that error appears in the above-identified patent and that said Letters Patent is hereby corrected as shown below:

ON THE COVER PAGE:

Replace the Title (item 54) and col. 1 as follows:

Replace "LIGHT SOURCE DEVICE AND LIGHT AMOUNT CORRECTING METHOD TO PERFORM LIGHT AMOUNT CORECTION CORRESPONDING TO A CHANGE IN A LIGHT SOURCE CHARACTERISTIC"

with --LIGHT SOURCE DEVICE AND LIGHT AMOUNT CORRECTING METHOD TO PERFORM LIGHT AMOUNT CORRECTION CORRESPONDING TO A CHANGE IN A LIGHT SOURCE CHARACTERISTIC--

Signed and Sealed this
Twenty-fourth Day of April, 2012

David J. Kappos
*Director of the United States Patent and Trademark Office*